(12) United States Patent
Manningham et al.

(10) Patent No.: US 11,604,767 B2
(45) Date of Patent: Mar. 14, 2023

(54) SYSTEMS AND METHODS FOR DATA DISTILLATION

(71) Applicant: Comcast Cable Communications, LLC, Philadelphia, PA (US)

(72) Inventors: Jason Manningham, Brooklyn, NY (US); John Maheswaran, New York, NY (US); Curtis Younker, Jersey City, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 149 days.

(21) Appl. No.: 16/376,148

(22) Filed: Apr. 5, 2019

(65) Prior Publication Data
US 2020/0320039 A1    Oct. 8, 2020

(51) Int. Cl.
| | | |
|---|---|---|
| *G06F 16/00* | (2019.01) | |
| *G06F 16/174* | (2019.01) | |
| *G06F 16/13* | (2019.01) | |
| *G06F 21/62* | (2013.01) | |
| *G06F 16/9535* | (2019.01) | |
| *H04L 9/06* | (2006.01) | |
| *G06F 16/11* | (2019.01) | |
| *H04L 9/00* | (2022.01) | |

(52) U.S. Cl.
CPC ........ *G06F 16/1748* (2019.01); *G06F 16/116* (2019.01); *G06F 16/134* (2019.01); *G06F 16/137* (2019.01); *G06F 16/9535* (2019.01); *G06F 21/6254* (2013.01); *H04L 9/0637* (2013.01); *H04L 9/0643* (2013.01); *H04L 9/50* (2022.05)

(58) Field of Classification Search
None
See application file for complete search history.

(56) References Cited

U.S. PATENT DOCUMENTS

| 6,397,224 | B1* | 5/2002 | Zubeldia | G06F 21/6254 |
| 7,480,308 | B1* | 1/2009 | Cohen | H04L 47/34 |
| | | | | 370/412 |
| 9,646,043 | B1* | 5/2017 | Aronovich | G06F 16/951 |
| 2009/0063485 | A1* | 3/2009 | Schneider | G06F 7/026 |
| 2009/0227290 | A1* | 9/2009 | Chien | H04M 1/72406 |
| | | | | 455/558 |
| 2012/0215498 | A1* | 8/2012 | Hallquist | G06F 30/23 |
| | | | | 703/1 |

(Continued)

*Primary Examiner* — Hasanul Mobin
(74) *Attorney, Agent, or Firm* — BakerHostetler

(57) ABSTRACT

Systems and methods are described for distilling data. First data associated with a user may be received. The first data associated with the user may comprise an anonymized hash of an identifier associated with the user. A database may be determined to comprise a first record indicating the anonymized hash. The first record may comprise second data associated with the user. Based on the determining that the database comprises the first record, a second record may be generated. The second record may comprise the first data associated with the user, the second data associated with the user, and the anonymized hash. Based on the determining that the database comprises the first record, the example method may be stored to the database. These and other user and/or data distillation methods and systems are described herein.

20 Claims, 14 Drawing Sheets

(56) References Cited

U.S. PATENT DOCUMENTS

| | | | |
|---|---|---|---|
| 2012/0303616 A1* | 11/2012 | Abuelsaad | G06F 21/6254 707/736 |
| 2013/0124491 A1* | 5/2013 | Pepper | G06F 16/90348 707/706 |
| 2013/0272377 A1* | 10/2013 | Karczewicz | H03M 7/30 341/51 |
| 2014/0371902 A1* | 12/2014 | McClelland | B65G 1/1371 700/218 |
| 2015/0242136 A1* | 8/2015 | Lin | G06F 3/0665 711/114 |
| 2015/0293980 A1* | 10/2015 | Dola | G06F 16/137 726/26 |
| 2015/0379060 A1* | 12/2015 | Levandoski | G06F 16/25 707/607 |
| 2018/0095719 A1* | 4/2018 | Winestock | G06F 7/08 |
| 2018/0349896 A1* | 12/2018 | Arora | H04L 9/3247 |
| 2019/0373469 A1* | 12/2019 | Bradley | H04L 9/3226 |

\* cited by examiner

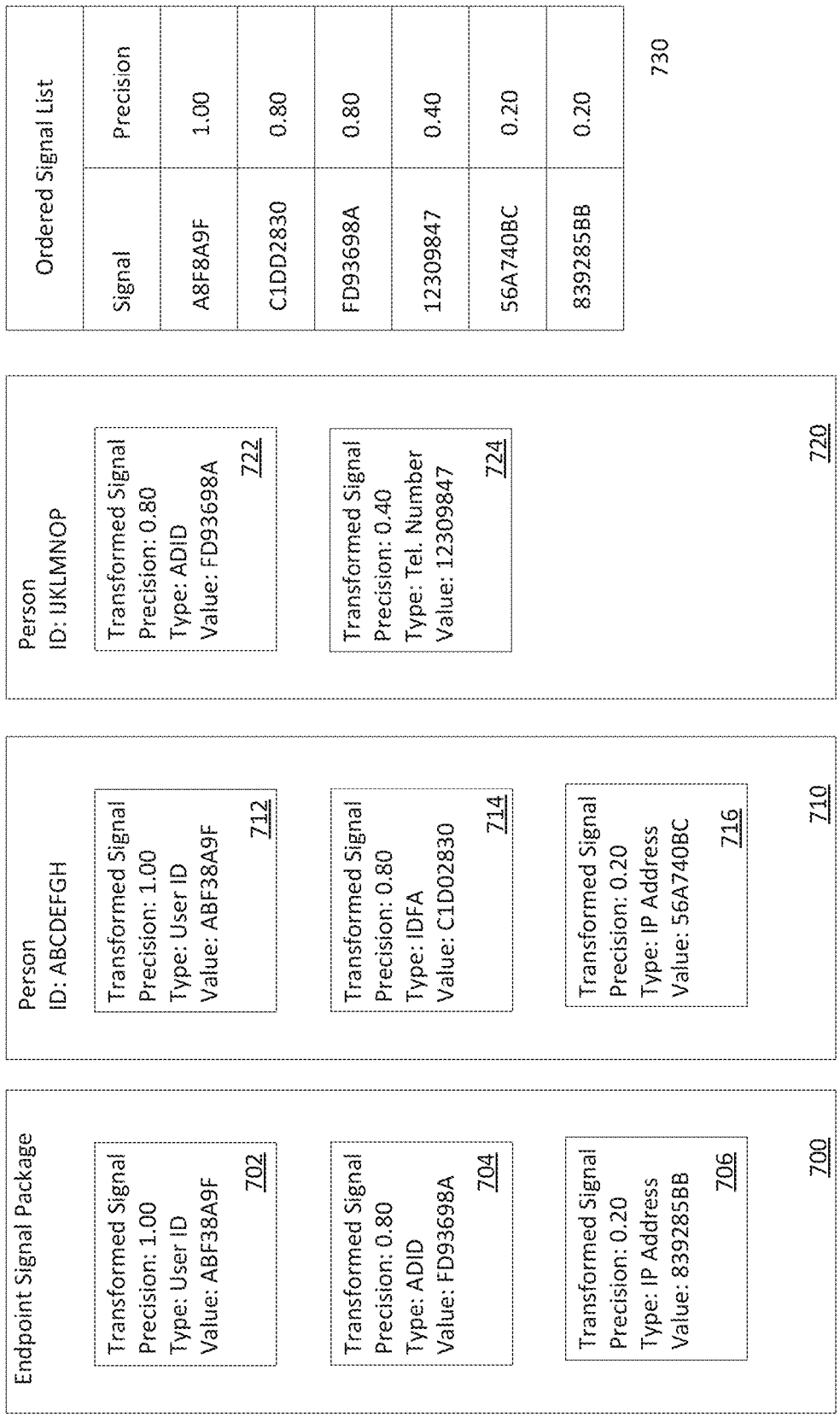

FIG. 8

Person
ID: ABCDEFGH

Transformed Signal
Type: User ID
Value: ABF38A9F
802

Transformed Signal
Type: IDFA
Value: C1D02830
804

Transformed Signal
Type: IP Address
Value: 56A740BC
806

Transformed Signal
Type: ADID
Value: FD93698A
808

Transformed Signal
Type: IP Address
Value: 839285BB
810

800

Person
ID: IJKLMNOP

Transformed Signal
Type: ADID
Value: FD93698A
822

Transformed Signal
Type: Tel. Number
Value: 12309847
824

Transformed Signal
Type: User ID
Value: ABF38A9F
826

Transformed Signal
Type: IP Address
Value: 839285BB
828

820

Ordered Signal List

| Signal | Precision |
|---|---|
| A8F8A9F | 1.00 |
| C1DD2830 | 0.80 |
| FD93698A | 0.80 |
| 12309847 | 0.40 |
| 56A740BC | 0.20 |
| 839285BB | 0.20 |

830

Signal Hash Map

| A8F8A9F | ABCDEFGH, IJKLMNOP |
| C1DD2830 | ABCDEFGH |
| FD93698A | ABCDEFGH, IJKLMNOP |
| 12309847 | IJKLMNOP |
| 56A740BC | ABCDEFGH |
| 839285BB | ABCDEFGH, IJKLMNOP |

| Signal Hash Map | |
|---|---|
| A8F8A9F | ABCDEFGH, IJKLMNOP |
| C1DD2830 | ABCDEFGH |
| FD93698A | ABCDEFGH, IJKLMNOP |
| 12309847 | IJKLMNOP |
| 56A740BC | ABCDEFGH |
| 839285BB | ABCDEFGH, IJKLMNOP |

900

Person
ID: QRSTUVWX
PRECISION: 1.00
COHERENCE: 0.8
REFERENCE: ABCDEFGH, IJKLMNOP Transformed Signal
Type: User ID
Value: ABF38A9F
912

Transformed Signal
Type: IDFA
Value: C1DD2830
914

Transformed Signal
Type: IP Address
Value: 839285BB
916

Transformed Signal
Type: ADID
Value: FD93698A
918

Transformed Signal
Type: Tel. Number
Value: 12309847
920

Transformed Signal
Type: IP Address
Value: 56A740BC
922

910

SYSTEMS AND METHODS FOR DATA DISTILLATION

BACKGROUND

Service providers, such as digital content distributors or advertisers, may collect information about users. The service providers may exchange collected data to maximize information discerned about users. However, the sharing of user data may raise privacy concerns about the user data. The service providers may remove identifying information from the shared data to maintain user privacy. However, the omission of information identifying users may result in the generation and/or storage of multiple sets of repetitive data, such as data associated with a same user. The generation and/or storage of redundant data may waste computational resources, such as processing power and/or storage space. Improvements are needed.

SUMMARY

Systems and methods are described for distilling data. Data associated with a user may be received by a computing device associated with a data aggregation platform. The data may comprise an anonymized hash of an identifier associated with the user, such as a telephone number, an email address, or a name. A database, such as a distributed database, may comprise a record indicating the anonymized hash. The record may comprise other data associated with the user. Based on the database comprising the record, another record may be generated. The new record may comprise the received data, the data in the stored record, and the anonymized hash. The new record may be stored to the database, such as by the computing device associated with data aggregation platform. The first record comprising the data associated with the user may be pruned, such as to de-duplicate the data stored to the database.

BRIEF DESCRIPTION OF THE DRAWINGS

The following drawings show generally, by way of example, but not by way of limitation, various examples discussed in the present disclosure. In the drawings:

FIG. 7 shows an example data distillation step.
FIG. 8 shows an example data distillation step.
FIG. 9 shows an example data distillation step.

DETAILED DESCRIPTION

Figure 1:
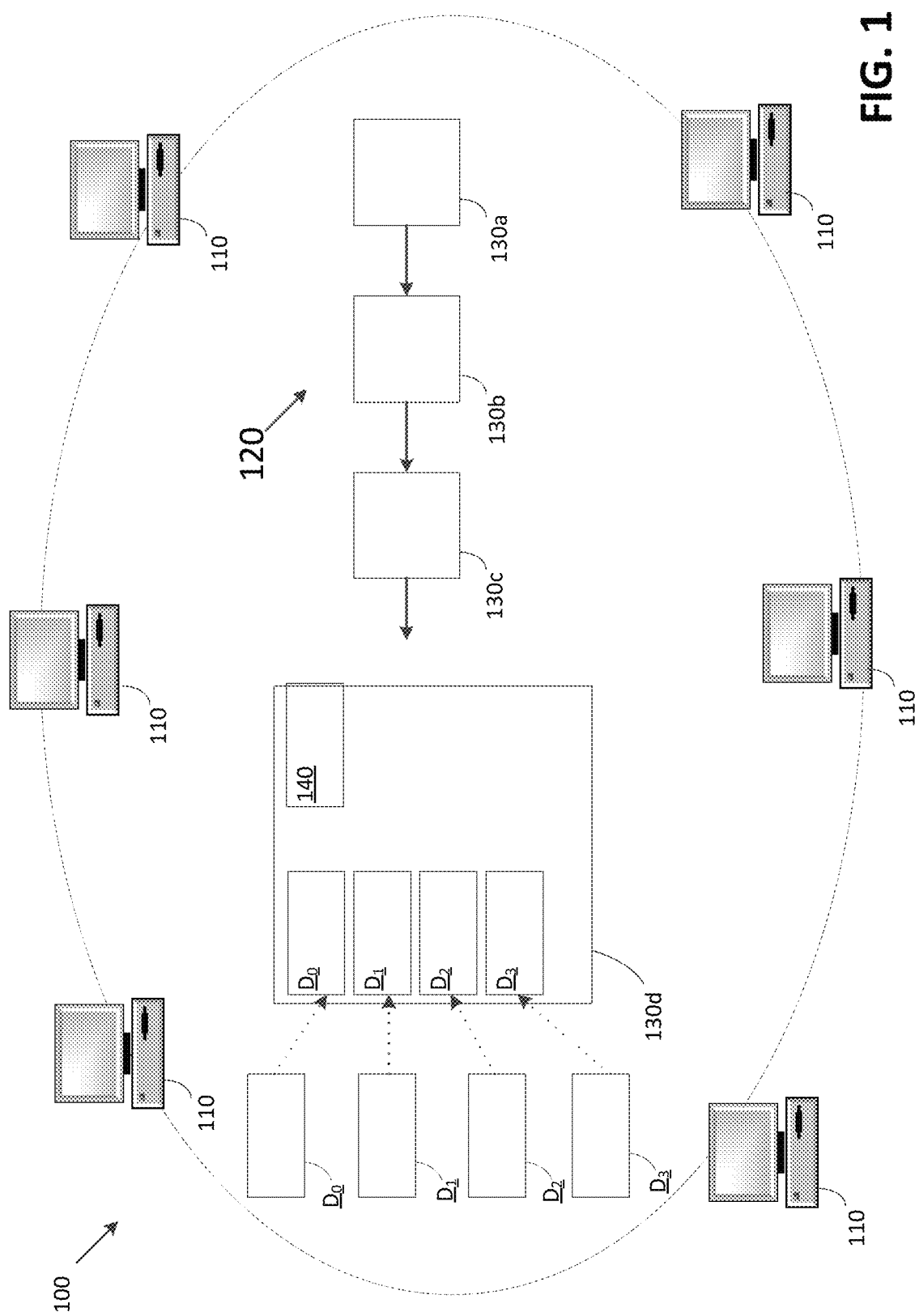
FIG. 1 shows an example distributed system architecture.

Systems and methods are described for distilling data. The distilling data may remove redundancies in generated and/or stored user data without revealing sensitive data. The data may relate to a plurality of identities associated with a user and/or a device. Distilling the data may comprise merging, combining, syncing, reducing, pruning, and/or curating the data. The data may be provided by multiple entities. The entities may independently collect data about a particular user and/or device. The entities may comprise service providers, retailers, content creators, ad placement entities, and/or data aggregation services, as examples.

Each of the plurality of entities may maintain private data associated with the particular user and/or device. The private data may be stored on a secured memory and/or device. The private data may be stored as encrypted data. The private data of the particular user and/or device may be identifiable by one or more identities. Identifying the private data may comprise organizing, searching, and/or sorting the private data. Each of the plurality of entities may not share private data with other entities of the plurality of entities.

Each of the plurality of entities may maintain public data associated with the particular user and/or device. The public data of the particular user and/or device may be identifiable (e.g., addressable, organized, searchable, sortable, etc.) by one or more identities. Each of the plurality of entities may share public data with other entities of the plurality of entities. The public data associated with the particular user and/or device may comprise data received (e.g., retrieved, downloaded, etc.) from other entities from the plurality of entities. The public data may comprise information from records from a public database accessible to the plurality of entities. Sharing public data among the plurality of entities may allow for better identification of a particular user and/or device.

A signal may be received at a node. The node may comprise a computing device. The node may comprise a server. The signal may originate from a particular user and/or device. The signal may comprise a first attribute type. The first attribute type may comprise a first value. The signal may comprise a second attribute type. The second attribute type may comprise a second value. A first record may be retrieved based on the first value. A second record may be retrieved based on the second value.

The first record may comprise a first identifier. The first record may comprise the first attribute type. The first attribute type of the first record may comprise the first value. The first record may be retrieved from a public database. The public database may comprise a distributed database. The distributed database may be shared across a network. For example, the distributed database may be shared by the nodes of a network. The public database may be mutable. The first record may be retrieved from a local database comprising public data. The second record may comprise a second identifier. The second record may comprise the second attribute type. The second attribute type of the second record may comprise the second value. The second record may be retrieved from the public database. The second record may be retrieved from the local database comprising public data.

Based on the received signal, a determination may be made that the first record and the second record refer to the same user and/or device. A third record may be generated. The third record may comprise the first attribute type comprising the first value. The third record may comprise the second attribute type comprising the second value. The third record may comprise attribute type/value combinations from the first record. The third record may comprise attribute type/value combinations from the second record. The third record may comprise attribute type/value combinations derived from the received signal. Duplicate attribute type/value combinations from the first record, attribute type/value combinations from the second record, and attribute type/ value combinations derived from the received signal may appear once in the third record.

The third record may be added to the public database. The third record may be added to the local database comprising public data. The first and second record may be removed from the public database. The first and second record may be removed from the local database comprising public data. Records may be continuously compared for overlapping attribute type/value combinations. Two records determined to identify the same user and/or device may be deleted and a new record may be generated from the two deleted records.

Systems and/or methods disclosed herein may be used by participants in the media industry to generate aggregated insights from first party data and scale addressable advertising by recognizing the same end users across multiple endpoints, applications, and/or data sets. Systems and/or methods disclosed herein may be used by participants to recognize mutual customers without exposing or sharing end user personal data and/or participant proprietary data.

System and/or methods described herein allow participants to contribute to a distributed identifier graph that deterministically identifies end users across participant footprints. The distributed identifier graph may be an industry-wide graph. The distributed identifier graph may comprise a peer-to-peer platform. The distributed identifier graph may be provably trustless. The distributed identifier graph may be compliant with government regulations for data security, such as compliant with the General Data Protection Regulation (GDPR). The distributed identifier graph may be cryptographically secure. The distributed identifier graph may comprise scalable infrastructure. The distributed identifier graph may comprise source code that is available for scrutiny (e.g., read-only open source). The participants may maintain nodes of a network. The network may comprise the distributed identifier graph.

Participants can resolve their customers against the broader distributed identifier graph by using two sources of information: existing customer relationship management data and by identifying cryptographically transformed pseudonymized signals generated by consumer devices in real time. As participants add new information to their respective nodes, the distributed identifier graph will be improved and propagated across the nodes in the network in near real time.

Distillation may comprise identification and deduplication of end users across devices and across participant footprints. Distillation may comprise improvement of the precision with which end users may be recognized across the network. Based on customer relationship management data and identified signals generated by consumer devices, distillation may improve the distributed identifier graph in near real time. Participants may use distillation to identify customers across devices. Participants may assign customers proprietary user identifiers. Devices may be used to connect a person's identity across multiple participants' data sets.

Each time a participant adds identifying information to their node, the identifying information may be pseudonymized. The pseudonymized identifying information may be compared with the pseudonymized information of other participants' users in a local version of a public person database. All person records with overlapping metadata in the local version of the public person database may be collected. All information about all collected person records may be considered holistically.

Starting with the most precise identifiers available, new person records may be generated in the system. The most precise identifiers may comprise email addresses or customer identifiers, as examples. Device and household level information may be appended to the new records. A local copy of the public person database then may be shared with all network participants. Distillation may stop based on there being no remaining identifiers are precise enough to recognize individual end users.

The distributed identifier graph may be incrementally improved each time an end user, such as a customer, consumer, or subscriber, interacts with an endpoint device. By only distilling based on new information entering a node, computational resources may be used more efficiently, especially for active humans and/or endpoints. Efficient use of computational resources may result in lower computational usage and/or power exertion. The distributed identifier graph may be kept current by allowing old records to go stale and deactivate. The distributed identifier graph may prune itself.

The distributed identifier graph may allow marketers to securely ask questions of data owners in order to better target premium video advertisers. Data owners, through bilateral agreements with other users, may opt in to monetize their data and be compensated for answering questions. Questions being asked and answered through the platform may be tracked. A record of a question asked and answered may be logged on the public database.

A log of participants having asked questions and participants having answered questions may be maintained. The log may be maintained on a distributed ledger, such as a blockchain. The log may facilitate consistency of records of a questioning participant's records and an answering participant's records. At an end of a billing cycle, data owners may query the log for billing purposes.

Using a distributed ledger may provide benefits regarding transparency and security. Distributed ledgers may provide a universal source of truth. Data owner records and data user records may remain consistent, which may reduce costs associated with reconciliation between organizations. Using a distributed ledger may allow participants to have a secure, immutable record of a number of questions a particular participant asked (and to which party), a number of questions asked by the particular participant were answered (and by which party), and/or a number of questions were answered by the particular participant (and from which party the questions came). Using a distributed ledger may increase audibility and error detection. Discrepancies between parties may be resolved by verifying hashes between blocks of transactions on the distributed ledger. Using a distributed ledger may allow a participant to see which other participants have joined and use the platform.

The distributed ledger may comprise a permissioned network. The permissioned network may only comprise permissioned nodes. The distributed ledger may use a Constellation framework. Sensitive data may remain off-chain between two participants. A hash of the sensitive data may be committed to the distributed ledger to support auditability. The distributed ledger may use a proof of stake framework. The distributed ledger may use a proprietary "proof of reputation stake" framework. In the proprietary "proof of reputation stake" framework, a reputation score may be computed for each participant. A reputation score may determine a respective participant's voting power in the distributed ledger consensus-based mining framework. A participant may increase a respective reputation score by increasing a respective reputation. The participant's reputation may have a data component. The participant's reputation may increase as the participant contributes data (e.g., signals, etc.) to the distributed ledger. The participant's reputation may have a technical component. The lower the technical error rate of a node maintained by a participant is, the higher the participant's reputation may be. The participant's reputation may have a financial component. The participant may maintain a high reputation score through timely payment of platform subscription fees.

FIG. 1 shows an example distributed system. The distributed system may comprise a network 100 of nodes 110. A node 110 may comprise a computing device, a central processing unit, a graphical processing unit, a field programmable gate array, or an application specific integrated circuit. A node 110 may comprise a cable modem, set-top box, lap top, smart phone, tablet, a portable digital assistant, a smart television, wearable computing device, mobile computing device, an Internet of Things ("IoT") device, or any device with computing capabilities or network connectivity capabilities. A node 110 may comprise one or more computing devices maintained by a participant.

The network 100 of nodes 110 may comprise a decentralized ledger. The decentralized ledger may not have a central administrator or centralized storage. Each node 110 in the network 100 may store a copy of a collection of data, such as a distributed ledger. A distributed ledger may comprise recorded entries, such as transactions. The data may be replicated, shared, or synchronized across the nodes 110. The decentralized ledger may be continually reconciled, such as to reflect changes to the collection of data. The nodes 110 may continually or periodically download the most recent version of the collection of data. Based on a node 110 joining the network 100, the node 110 may automatically download the collection of data.

The decentralized ledger may comprise a blockchain 120. The decentralized database, such as the distributed ledger, may comprise a blockchain database and/or utilize blockchain data management techniques. A blockchain 120 may comprise one or more blocks 130 in which data is recorded. The blocks 130 in the blockchain 120 may function as a mechanism to organize the data in the blockchain 120. The blocks 130 may be linked in a sequence determined by a relationship of the data in the blocks 130, such as the chronology in which the data is recorded or validated. The blocks 130 may be linked to deter retroactive modification of data in the blockchain 120.

The nodes 110 in the network 100 may build the blockchain 120, such as by adding blocks 130 to the blockchain 120. The nodes 110 may perform several operations to build the blockchain 120. Based on new data $D_0$, $D_1$, $D_2$, $D_3$ being received by the network 100, the nodes 110 may validate the new data $D_0$, $D_1$, $D_2$, $D_3$. If the new data $D_0$, $D_1$, $D_2$, $D_3$ comprises transactions, the nodes 110 may validate, verify, or authenticate the identity of the parties to the transaction. The one or more transactions may comprise end user information. The one or more transactions may comprise hashes (e.g., encrypted versions, etc.) of end user information. The one or more transactions may comprise a query. The one or more transactions may comprise a hash of a query. The one or more transactions may comprise a response to a query. The one or more transactions may comprise a hash of a response to a query. A transaction may comprise a public key of a party to the transaction and a digital signature of the party to the transaction. The digital signature may comprise the hash of transaction data, such as with a cryptographic hash function. The digital signature may comprise a hash of transaction data encrypted with a private key corresponding to the public key. Examples of hash functions include MD4, MD5, SHA-1, SHA-256, SHA-512, and SHA-3. The digital signature may be validated by the nodes 110, such as by decrypting the digital signature with the public key. The digital signature may allow for verification of the transaction while maintaining the anonymity of the parties to the transaction.

The nodes 110 may collate the new data $D_0$, $D_1$, $D_2$, $D_3$ into a new block 130d. The nodes 110 may record one data entry Do in a new block 130d. The nodes 110 may perform an operation to add the new block 130d to the blockchain 120. If the data in the blocks 130 is related chronologically, such as where the first block 130a in the chain records older data than the data of subsequent blocks 130b, 130c, the nodes 110 may perform a timestamp function to log the sequence in which blocks 130 are added to the blockchain 120. The nodes 110 may append a hash of the previous block 130c to the new block 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the blockchain 120.

The nodes 110 may be incentivized to perform the operation to add a new block 130d to the blockchain 120. A block 130d may be assigned a value 140, such as a coin or unit of digital currency that will be transferred to one or more nodes 110 that perform part or all of the operation. Also, if the data $D_0$, $D_1$, $D_2$, $D_3$ recorded in a block 130d comprises transactions, a transaction may assign a transaction fee $TF_0$, $TF_1$, $TF_2$, $TF_3$ which may be transferred to one or more nodes 110 that perform the operation on the block 130d in which the transaction is recorded. If an incentive is provided for nodes 110 to perform the operation to add the new block 130d to the blockchain 120, performance of the operation may be referred to as mining.

The nodes 110 may individually perform an operation to build the blockchain 120. The nodes 110 may lend or combine their processing power, such as in a pool, to perform an operation to build the blockchain 120. If the nodes 110 work in tandem, incentives, such as the value 140, may be divided amongst the nodes 110. Incentives may be divided proportionally to contribution of the nodes 110 to the work.

Once the operation is performed to add a new block 130d to the blockchain 120, the nodes 110 may communicate the new block 130d to the network 100. The nodes 110 may express their acceptance of the new block 130d to the blockchain 120 by working off the block 130d to perform the operation to add a subsequent block to the blockchain 120. If more than one version of the blockchain 120 exists, the nodes 110 may attempt to work off the longest blockchain 120. The longest blockchain 120 may be determined by an algorithm for scoring the blockchain 120. A blockchain 120 may be assigned a score based on the computational work required to generate the blockchain 120. A node 110 may communicate the longest blockchain 120 that the node 110 has observed to the network 100, such as with a gossip protocol.

The network 100 may have self-correcting mechanisms, such as to address discrepancies between nodes 110 in the network 100. If there is a fork in a blockchain 120, a node 110 working off one branch of the blockchain 120 may switch to a second branch of the blockchain 120, if the second branch becomes longer than the first branch. If a node 110 does not receive a block 130b, the node 110 may request the block 130b based on the node 110 receiving the next block 130c and determines that the node 110 did not receive the previous block 130b.

One or more nodes 110 in the network 100 may not participate in building the blockchain 120. The operations that the nodes 110 in the network 100 may perform relating to the blockchain may not be limited to building the blockchain 120. One or more nodes 110 may monitor the blockchain 120 for particular transactions. The nodes 110 may monitor the blockchain 120 for transactions that comprise an identifier associated with a party.

Figure 2:
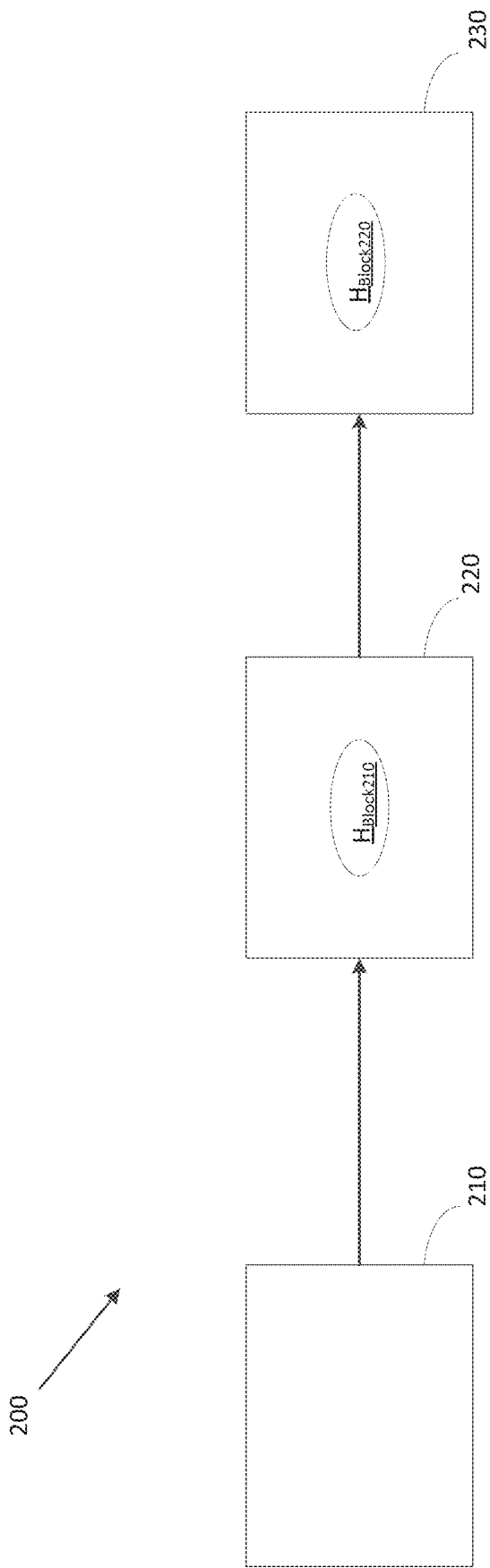
FIG. 2 shows an example blockchain architecture.

FIG. 2 shows an example distributed ledger architecture. A distributed ledger may comprise a blockchain 200 in which one or more transactions are recorded in blocks 210, 220, 230. The one or more transactions may comprise end user information. The one or more transactions may comprise hashes (e.g., encrypted versions, etc.) of end user information. The one or more transactions may comprise a query. The one or more transactions may comprise a hash of a query. The one or more transactions may comprise a response to a query. The one or more transactions may comprise a hash of a response to a query. The distributed ledger may comprise a blockchain database and/or utilize blockchain data management techniques. The blocks 210, 220, 230 may be linked in a sequence that represents the chronology of the execution, validation, or recording of the transactions. The blockchain 200 may comprise a genesis block 210 that records the earliest transaction in the blockchain 200 and comprises the first block 210 in the blockchain 200.

Each block 220, 230 following the genesis block 210 may record a transaction that was executed or validated subsequent to the transaction of the preceding block 210, 220, 230 in the blockchain 200. Each block 210, 220, 230 may record a transaction that occurred prior to the transaction of the subsequent block in the blockchain 200. The block 230 may record a transaction that occurred after the transaction recorded in the block 220. A new transaction may be recorded in a new block. The new block may be appended to the last block 230 in the blockchain 200. Although the example blockchain 200 is shown as comprising three blocks 210, 220, 230, the blockchain 200 may comprise less than three blocks or more than three blocks. The blocks 210, 220, 230 may record transactions as hashes of the transactions.

The blocks 210, 220, 230 may function as a mechanism to implement a timestamp server to generate computational proof of the chronological order of the transactions in the blockchain 200. A timestamp of a block 210, 220, 230 may comprise a hash of the transaction in the block 210, 220, 230 and the transaction of the previous block 210, 220, 230 in the blockchain 200. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise scanning for a proof ($Proof_{210}$, $Proof_{220}$, $Proof_{230}$), such as a string or value, that if cryptographically hashed with the hash of the transaction of a block ($H_{Transaction}$) and the hash of the transaction of the previous block yields a hash ($H_{Block}$) with a pre-determined number of leading zero bits. A proof ($Proof_{210}$, $Proof_{220}$, $Proof_{230}$) may be identified such that the hash ($H_{Block}$) has 60 leading bits that are zero.

A proof-of-work for the block 220 may comprise scanning for a proof ($Proof_{220}$) that if hashed with the transaction of the block 220 ($H_{Transaction220}$) and the hash of the previous block 210 ($H_{Block210}$) yields an output ($H_{Block220}$) that has a pre-determined number of leading zero bits. The proof-of-work may be solved for a hash function in which a hash of the transaction ($H_{Transaction}$) is an input of the hash function. The next block 230 in the blockchain 200 will be appended to the blockchain 200 based on a proof-of-work being performed to identify a proof ($Proof_{230}$) which hashed with the transaction of the block 230 (or hash of the transaction $H_{Transaction230}$) and the hash of the block 220 ($H_{Block220}$) yields an output ($H_{Block230}$) with a pre-determined number of leading zero bits. Once the proof ($Proof_{230}$) is identified, the block 230 may be broadcast through the network. If the block 230 is accepted, the nodes may work on creating the next block in the blockchain 200 using the hash ($H_{Block230}$) of the accepted block 230.

An iterative proof-of-work protocol may deter modification of a block in the blockchain 200 as it would require re-doing the proof-of-work for each proceeding block in the blockchain 200. Modification of a transaction in the block 210 may require performance of a new proof-of-work for block 210, yielding a new hash ($H_{Block210}$) for the block 210. Consequently, a new proof-of-work may be required for the block 220 using the new hash ($H_{Block210}$) for the block 210, yielding a new hash ($H_{Block220}$) for the block 220. Each subsequent block in the blockchain 200 may require a new proof-of-work.

Figure 3:
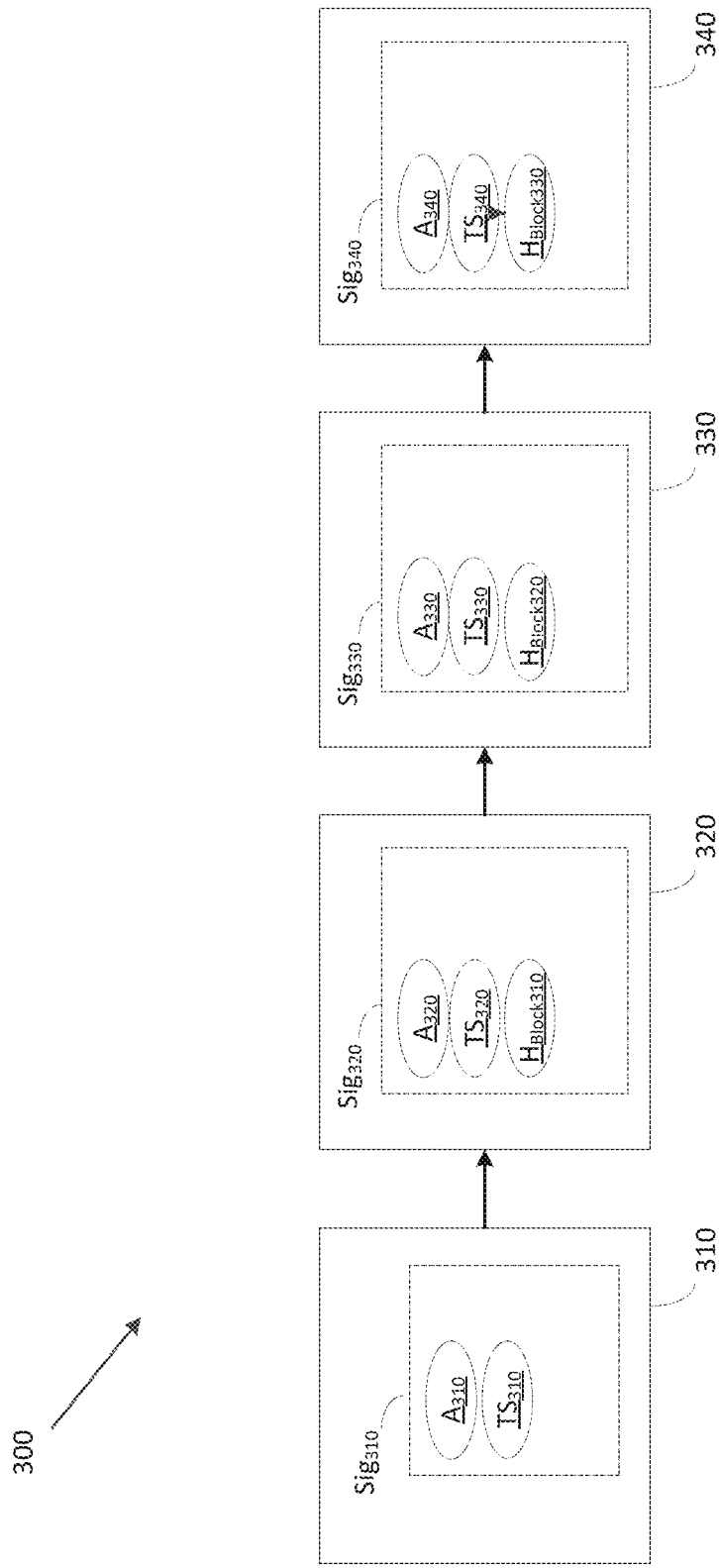
FIG. 3 shows an example distributed ledger architecture.

FIG. 3 shows an example distributed ledger architecture. The system may comprise a distributed ledger 300. The distributed ledger 300 may comprise a plurality of blocks 310, 320, 330, 340. Each block 310, 320, 330, 340 may comprise one or more distributed ledger entries. The distributed ledger entry may comprise end user information, a hash (e.g., encrypted version, etc.) of end user information, a query, a hash of a query, a response to a query, a hash of a response to a query, etc. Each block 310, 320, 330, 340 may comprise a hash of a key ($H_{PubKey310}$, $H_{PubKey320}$, $H_{PubKey330}$, $H_{PubKey340}$) of the device. The key may comprise a public key of the device. The public key may be unique to the device. The public key may be paired with a private key of the device. Each block 310, 320, 330, 340 may comprise an address of the device ($A_{310}$, $A_{320}$, $A_{330}$, $A_{340}$). The address may comprise a hash of the key ($H_{PubKey310}$, $H_{PubKey320}$, $H_{PubKey330}$, $H_{PubKey340}$) of the device, such as the public key of the device.

Each block 310, 320, 330, 340 may comprise a timestamp ($TS_{310}$, $TS_{320}$, $TS_{330}$, $TS_{340}$). The timestamp ($TS_{310}$, $TS_{320}$, $TS_{330}$, $TS_{340}$) may indicate when the block 310, 320, 330, 340 was generated. The inclusion of the timestamps ($TS_{310}$, $TS_{320}$, $TS_{330}$, $TS_{340}$) may link the blocks 310, 320, 330, 340. Each block generated after a genesis block 320, 330, 340 may comprise a hash of the previous block ($H_{Block310}$, $H_{Block320}$, $H_{Block330}$) in the distributed ledger 300. The inclusion of the hash of the previous block ($H_{Block310}$, $H_{Block320}$, $H_{Block330}$) in the distributed ledger 300 may link the blocks 310, 320, 330, 340. The inclusion of the hash of the previous blocks ($H_{Block310}$, $H_{Block320}$, $H_{Block330}$) in the distributed ledger 300 may comprise an iterative chain of hash functions. The linking of the blocks 310, 320, 330, 340 may deter unauthorized tampering or breaching of the distributed ledger 300. Tampering with a block 310, such as retroactively modifying the block 310, may require modification of the subsequent blocks 320, 330, 340. The computing power or labor to tamper or breach the distributed ledger 300 may deter targeting of the distributed ledger 300 by an unauthorized entity.

Each block 310, 320, 330, 340 may comprise a signature ($Sig_{310}$, $Sig_{320}$, $Sig_{330}$, $Sig_{340}$). The signature ($Sig_{310}$, $Sig_{320}$, $Sig_{330}$, $Sig_{340}$) may comprise an encryption with a key of the device, such as the private key of the device. The signature ($Sig_{310}$, $Sig_{320}$, $Sig_{330}$, $Sig_{340}$) may comprise an encryption of one or more of the address of the device ($A_{310}$, $A_{320}$, $A_{330}$, $A_{340}$), the hash of the key ($H_{PubKey310}$, $H_{PubKey320}$, $H_{PubKey330}$, $H_{PubKey340}$), the timestamp ($TS_{310}$, $TS_{320}$, $TS_{330}$, $TS_{340}$) and the hash of the previous block ($H_{Block310}$, $H_{Block320}$, $H_{Block330}$). The signature ($Sig_{310}$, $Sig_{320}$, $Sig_{330}$, $Sig_{340}$) may deter unauthorized tampering with the distributed ledger 300. The private key used to sign may be necessary to generate or retroactively modify a block or entry of the distributed ledger 300. Only the device or entity with the private key may alter or add to the distributed ledger 300. The device or the entity may comprise an administrator of the distributed ledger 300.

The distributed ledger 300 may comprise a genesis block 310. The genesis block 310 may comprise the first block of the distributed ledger 300. The genesis block 310 may comprise the oldest block or the first block generated of the distributed ledger 300. Participant nodes may generate the subsequent blocks 320, 330, 340 of the distributed ledger 300.

The distributed ledger 300 may be stored at a distributed network. The distributed ledger 300 may be stored across nodes, such as the nodes 110 of FIG. 1, in a distributed network, such as the network 100 of FIG. 1. The nodes may comprise computing devices. The nodes may comprise associated devices.

The distributed ledger 300 may be updated. Updating the distributed ledger 300 may comprise creating a distributed ledger entry. Updating the distributed ledger 300 may comprise transmitting a distributed ledger entry to the distributed ledger 300. Updating the blockchain may comprise recording the distributed ledger entry in a block 310, 320, 330, 340 of the distributed ledger 300. Updating the blockchain may comprise creating a block 310, 320, 330, 340 of the distributed ledger 300.

The distributed ledger 300 may be updated by a computing device or an application. The distributed ledger 300 may be updated by a participant node. Updating the distributed ledger 300 may comprise creating a distributed ledger entry, such as using the custom software library. Updating the distributed ledger 300 may comprise a participant node mining a distributed ledger entry into the distributed ledger 300. Updating the distributed ledger 300 may comprise a participant node performing a proof of stake algorithm with a distributed ledger entry. Updating the distributed ledger 300 may comprise a participant node performing a proprietary "proof of reputation stake" algorithm with a distributed ledger entry.

Figure 4:
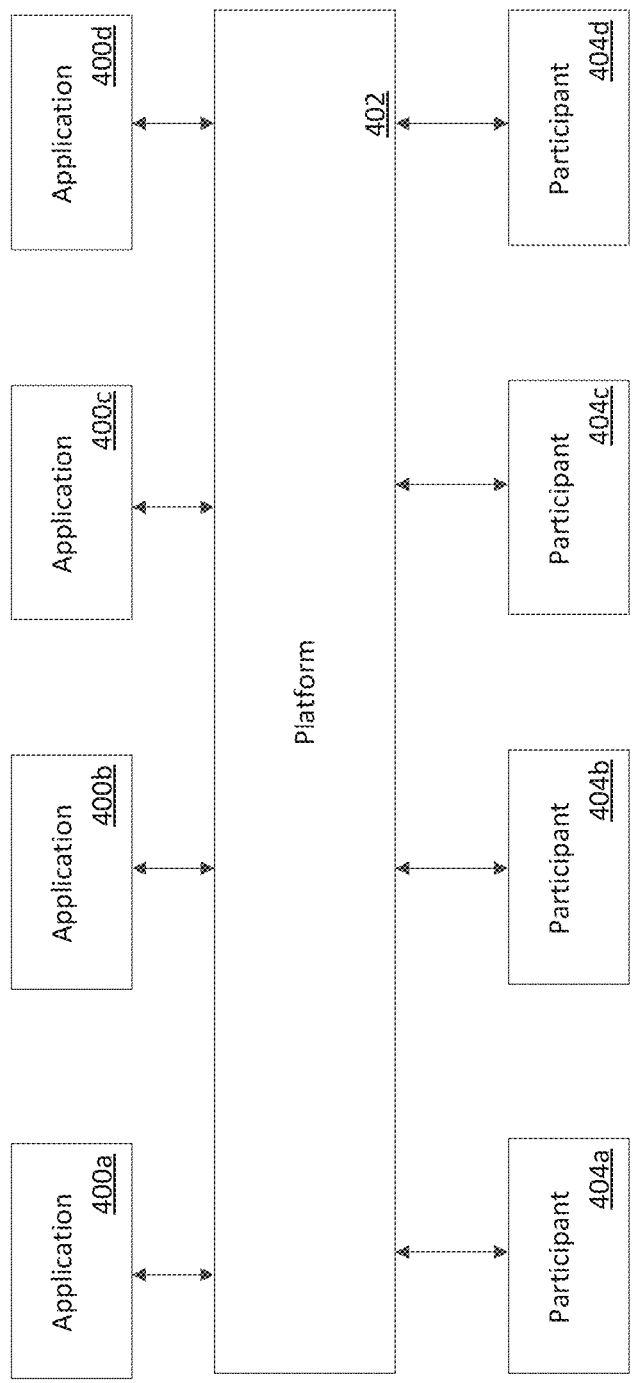
FIG. 4 shows an example relationship arrangement between applications and participants.

FIG. 4 shows an example relationship arrangement between applications 400a, 400b, 400c, 400d and participants 404a, 404b, 404c, 404d. One or more of the participants 404a, 404b, 404c, 404d may access the one or more applications 400a, 400b, 400c, 400d via a platform 402. The one or more participants 404a, 404b, 404c, 404d may comprise marketers. Marketers may reduce spending by using data from the platform 402 and/or the peer-to-peer distributed data platform to reduce marketing spending by uniquely targeting customers across screens. Marketers may use data from the platform 402 and/or the peer-to-peer distributed data platform to measure return on investment by linking customer viewership, purchases, and exposure data.

The one or more participants 404a, 404b, 404c, 404d may comprise publishers. Publishers may use data from the platform 402 and/or the peer-to-peer distributed data platform to de-duplicate audience reach across screens. Publishers may use data from the platform 402 and/or the peer-to-peer distributed data platform to improve yield by more efficient planning and targeting.

The one or more participants 404a, 404b, 404c, 404d may comprise operators and/or distributors. The operators and/or distributors may use the platform 402 and/or the peer-to-peer distributed data platform to monetize "walled off" audience data securely and safely, while protecting sensitive subscriber information.

The one or more applications 400a, 400b, 400c, 400d may provide tools to allow the one or more participants 404a, 404b, 404c, 404d to share data. The one or more applications 400a, 400b, 400c, 400d may allow the one or more participants 404a, 404b, 404c, 404d to use data shared by the participants across a variety of business functions for personalized experiences and/or targeted advertising. The one or more applications 400a, 400b, 400c, 400d may comprise applications for targeting, analytics, attribution, ratings, the like, and/or any combination of the foregoing regarding content, demographics, advertising, etc. The one or more applications 400a, 400b, 400c, 400d may be generated by third parties. The one or more applications 400a, 400b, 400c, 400d may be generated by teams internal to the one or more participants 404a, 404b, 404c, 404d. The one or more applications 400a, 400b, 400c, 400d may be provided through a cloud computing environment. The one or more applications 400a, 400b, 400c, 400d may be provided through a network computing environment.

The platform 402 may provide the one or more applications 400a, 400b, 400c, 400d for the one or more participants 404a, 404b, 404c, 404d. The platform 402 may certify the one or more applications 400a, 400b, 400c, 400d. The platform 402 may comprise a certification authority. The certification authority may certify applications. Certification by the platform 402 of an application may indicate one or more parameters are met. The one or more applications 400a, 400b, 400c, 400d may be generated using one or more application programming interfaces (APIs) provided by the platform 402. The platform 402 may be implemented in a cloud computing environment. The platform 402 may be implemented in a network computing environment. The platform 402 may comprise a developer community. The platform 402 may comprise a research and development group. The platform 402 may comprise a distributed community, free of centralized control and/or ownership. The platform 402 may comprise a global community. The platform 402 may be implemented by one or more entities, such as companies, corporations, and/or startups.

The participants 404a, 404b, 404c, 404d may access the platform 402 via nodes. The one or more participants 404a, 404b, 404c, 404d may comprise data owners. The one or more participants 404a, 404b, 404c, 404d may share data and/or insights securely. The one or more participants 404a, 404b, 404c, 404d may comprise one or more computing devices in communication with a cloud computing environment. The one or more participants 404a, 404b, 404c, 404d may comprise one or more computing devices in communication with a network computing environment. The one or more participants 404a, 404b, 404c, 404d may communicate with each other using a peer-to-peer distributed data platform. The peer-to-peer distributed data platform may be ran by the one or more participants 404a, 404b, 404c, 404d. The peer-to-peer distributed data platform may comprise a blockchain.

One of the one or more applications may comprise a blind identification-based targeting application. The blind identification-based targeting application may allow two or more participants to anonymously match specific audience (e.g., customer, client, subscriber, etc.) identifiers. The blind identification-based targeting application may allow dynamic targeting of specific audience identifiers.

One of the one or more applications may comprise an attribute/demographic targeting application. The attribute/demographic targeting application may allow participants to extend reach by allowing participants to specify attributes and/or demographics of end users to be targeted and allowing participants to rent identifiers with the specified attributes and/or demographics from other participants. Specified attributes may comprise specified behavioral patterns. Specified attributes may comprise specified locations visited. Specified attributes may comprise specified content consumed.

One of the one or more applications may comprise a distributed analytics application. A participant may use the distributed analytics application to obtain insights from other participants' end users' private data to inform planning, measurement, attribution, and other analytic requests.

Figure 5:
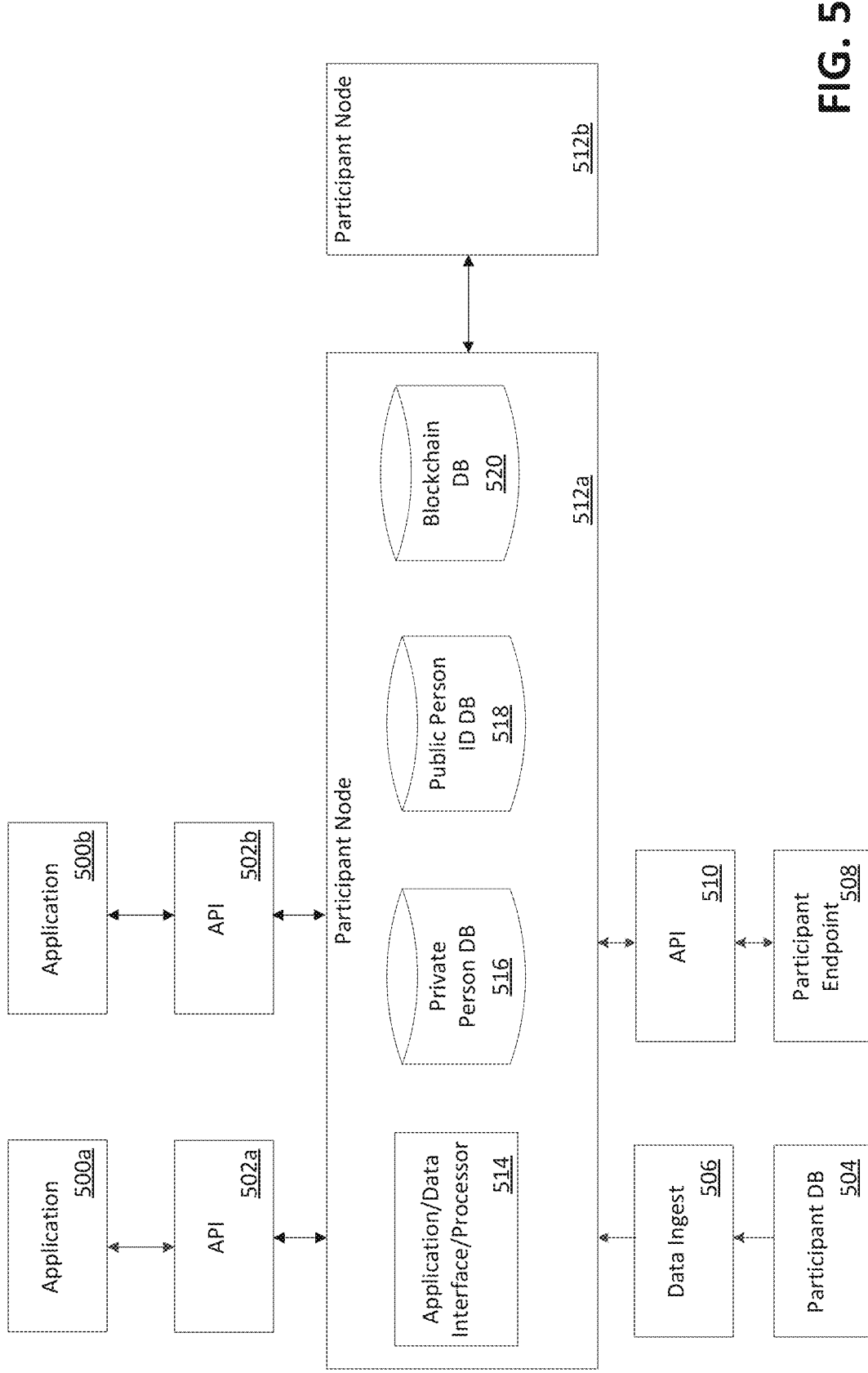
FIG. 5 shows an example conceptual architecture.

FIG. 5 shows an example conceptual architecture. The example conceptual architecture comprises one or more participant nodes 512a, 512b. Each participant 404a, 404b, 404c, 404d in FIG. 4 may comprise one or more of the one or more participant nodes 512a, 512b. Each participant node 512a, 512b may be implemented in a cloud computing environment. Each participant node 512a, 512b may be implemented in a network computing environment. Each participant node 512a, 512b may be implemented in a virtual private cloud (VPC).

Each participant node 512a, 512b may use one or more applications 500a, 500b. The one or more applications 500a, 500b may comprise one or more applications 400a, 400b, 400c, 400d from FIG. 4. The one or more applications 500a, 500b may implement one or more application programming interfaces (APIs) 502a, 502b. The one or more applications 500a, 500b may be accessed using one or more application programming interfaces (APIs) 502a, 502b.

Each participant node 512a, 512b may receive data from one or more respective participant database(s) 504 via a respective data ingestion module 506. The data ingestion module may comprise one or more sets of computer instructions for obtaining and importing bulk data to a respective participant node 512a, 512b. Data in the respective participant database 504 and/or imported by the data ingestion module 506 may comprise participant end user data, such as data from a customer, consumer, and/or subscriber.

Each participant node 512a, 512b may receive data from a respective participant endpoint 508. The respective participant endpoint 508 may comprise a device, such as a screen, content consumption device, television, computer, and/or smart phone that a participant end user uses to employ services of the participant. As an end user uses the respective participant endpoint 508, the respective participant endpoint 508 may send signals to the respective participant node 512a. The respective participant endpoint 508 may implement one or more application programming interfaces (APIs) 510. The respective participant endpoint 508 may access one or more application programming interfaces (APIs) 510 to help transfer signals to the respective participant node 512a. Each participant node 512a, 512b, may receive data from multiple respective endpoints 508.

Each participant node 512a, 512b may comprise an application, data interface, and/or processor 514. The application, data interface, and/or processor 514 may comprise computer hardware. The application, data interface, and/or processor 514 may comprise one or more sets of computer instructions. The application, data interface and/or processor 514 may handle (e.g., control, initiate, orchestrate, etc.) interactions with the applications 500a, 500b. The application, data interface, and/or processor 514 may receive and control the storage of data received from the respective participant database 504. The application, data interface, and/or processor 514 may receive and control the processing of signals received from the respective participant endpoint 508. The application, data interface, and/or processor 514 service modules and/or microservice modules.

Each participant node 512a, 512b may comprise a private person database 516. The private person database 516 may comprise all of the data received from the one or more respective participant database(s) 504. The private person database 516 may comprise private data received from the one or more respective participant database(s) 504. The private person database 516 may comprise all of the data received from the one or more respective participant endpoint(s) 508. The private person database 516 may comprise private data received from the one or more respective participant endpoint(s) 508.

Each participant node 512a, 512b may comprise a public person identifier database 518. The public person identifier database 58 may comprise a cryptographically secure index of pseudonymized person identifiers ("Public Person IDs" or "PPIDs") from the applicable participant's collected data. The public person identifier database 518 may comprise public data received from the one or more respective participant database(s) 504. The public person identifier database 518 may comprise public data received from the one or more respective participant endpoint(s) 508. Device information ("signals") from the one or more respective participant endpoint(s) 508 and/or the one or more respective participant database(s) 504 may be cryptographically transformed, and then populated in the public person identifier database 518. The transformed signals may be linked to PPIDs, together forming mapping elements.

Each participant node 512a, 512b may comprise a blockchain database 520. The blockchain database 520 may comprise a local copy of the blockchain. Each participant node 512a, 512b may alter the blockchain via a proprietary "proof of reputation" stake algorithm. The mapping elements may be added to the blockchain by a respective participant node 512a, 512b. The mapping elements may be propagated across a peer-to-peer network to all participant nodes 512a, 512b, by a respective participant node. Each participant node, such as participant node 512a, may communicate with another participate node, such as 512b, using a peer-to-peer protocol.

Figure 6:
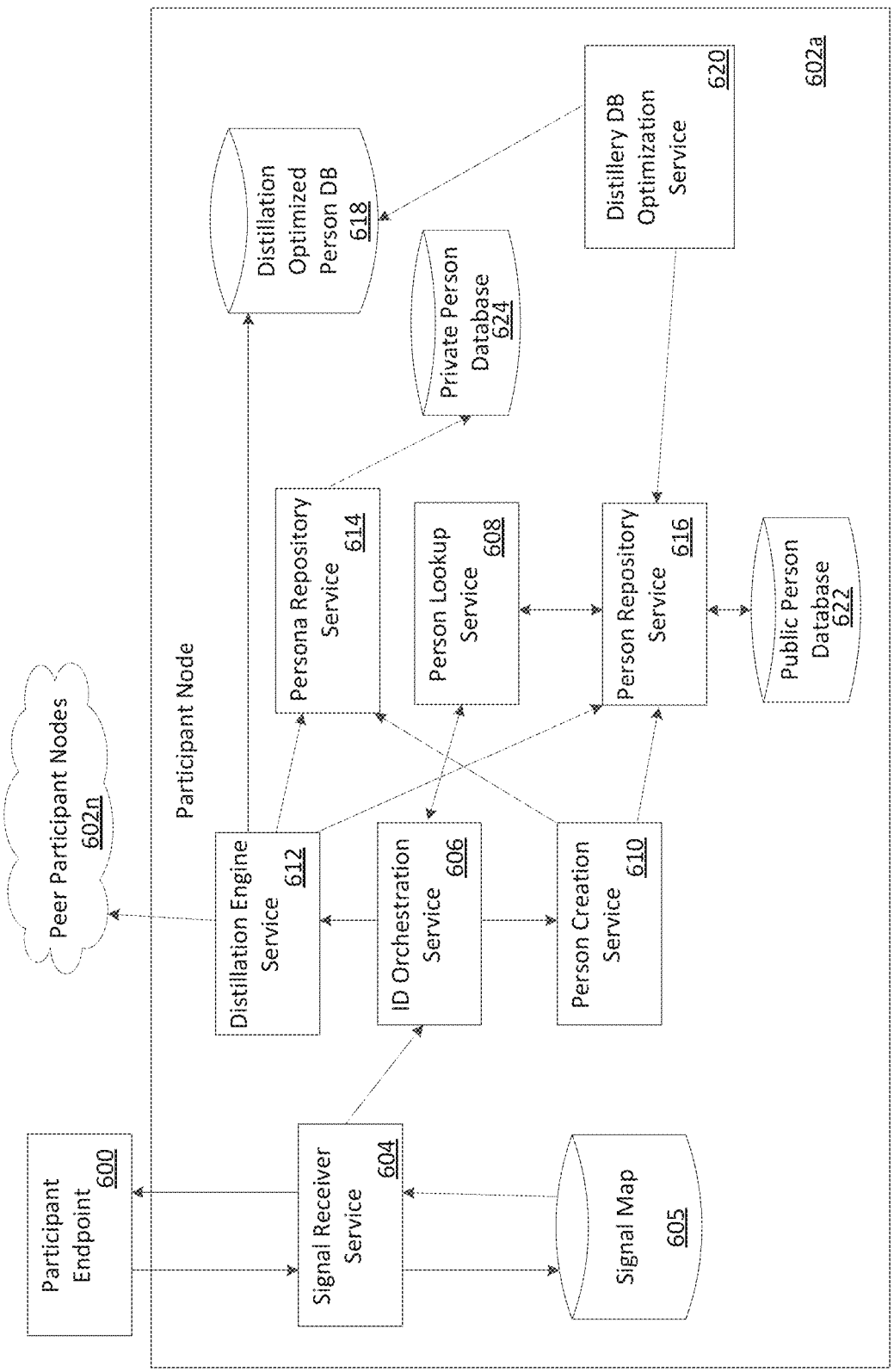
FIG. 6 shows an example block diagram of a node.

FIG. 6 shows an example block diagram of a participant node 602a. The participant node 602a may be in communication with a participant endpoint 600. The participant node 602a may be in communication with one or more peer participant nodes 602n. Each participant 404a, 404b, 404c, 404d in FIG. 4 may comprise a participant node 602a. One or more participants 404a, 404b, 404c, 404d in FIG. 4 may comprise one or more peer participant nodes 602n. The participant node 602a may comprise a participant node 512a, 512b in FIG. 5. The one or more peer participant nodes 602n may comprise a participant node 512a, 512b in FIG. 5.

The participant node 602a may comprise a signal receiver service module 604, a signal map 605, an identifier orchestration service module 606, a person lookup service module 608, a person creation service module 610, a distillation engine service module 612, a persona repository service module 614, a person repository service module 616, a distillation optimized person database 618, a distillery database optimization service module 620, a public person database 622, and a private person database 624. The signal receiver service module 604, the identifier orchestration service module 606, the person lookup service module 608, the person creation service module 610, the distillation engine service module 612, the persona repository service module 614, the person repository service module 616, and/or the distillery database optimization service module 620 may comprise one or more sets of computer instructions. The signal map 605, the distillation optimized person database 618, the public person database 622, and/or the private person database 624 may comprise data storage.

The distillery database optimization service module 620 may key a lookup table with data from transformed signals that correspond to each person record that comprises data from the signals. The person repository service module 616 may receive the lookup table from the distillery database optimization service module 620. The distillation optimized person database 618 may receive the lookup table from the distillery database optimization service module 620.

The participant endpoint 600 may submit a signal package to the signal receiver service module 604 of the participant node 602a. The signal receiver service module 604 may parse signals in the signal package. The signal receiver service module 604 may hash the parsed signals. The signal receiver service module 604 may transmit the hashed signals to the signal map 605. The signal map 605 may identify a public person identifier (PPID) that corresponds to the hashed signals and transmit the identified PPID to the signal receiver service module 604. The signal receiver service module 604 may return a ticket comprising the identified PPID to the participant endpoint 600. The signal receiver service module 604 may push the signal package, the hashed signals, and the identified PPID to the identity orchestrator service module 606.

The identity orchestrator service module 606 may query the hashed signals against the person lookup service module 608. The person lookup service module 608 may in turn pass the hashed signals to the person repository service module 616. The person repository service module 616 may pass the hashed signals to the public person database 622 and receive a list of persons comprising one or more of the hashed signals, and associated signals and metadata, from the public person database 622. The person repository service module 616 may pass the list of persons and associated signals and metadata to the person lookup service module 608. The person lookup service module 608 may pass the list of persons and associated signals and metadata to the identity orchestrator service module 606.

If the list of persons is empty, then the identity orchestrator service module 606 may push the hashed signals to the person creation service module 610. If the list of persons is empty, then no match with the hashed signals may be found. If the list of persons is empty, then no match with sufficient precision with the hashed signals may be found. The person creation service module 610 may use the hashed signals to generate a new person. The person creation service module 610 may push the new person to the persona repository service module 614. The persona repository service module 614 may add the new person to the private person database 624. The person creation service module 610 may push the new person to the person repository service module 616. The person repository service module 616 may add the new person to the public person database 622.

If the list of persons is not empty, then the identity orchestrator service module 606 may push the list of persons and associated signals and metadata to the distillation engine service module 612. The distillation engine service module 612 may comprise an Apache Kafka platform. The distillation engine service module 612 may comprise a component comprising an Apache Kafka platform. The distillation engine service module 612 may be in communication with an Apache Kafka platform. The distillation engine service module 612 may group sets of PPIDs and associated signal sets. The identity orchestrator service module 606 may push the list of persons and associated signals and metadata to the Apache Kafka platform and the distillation engine service module 612 may pull PPIDs and associated signal sets from the Apache Kafka platform. The distillation engine service module 612 may scale horizontally.

The distillation engine service module 612 may run a distillation algorithm to distill data, such as the list of persons and associated signals and/or metadata. An example distillation algorithm is described below in reference to FIGS. 7-9. After the distillation algorithm is performed, the distillation engine service module 612 may use the distilled data to update the distillation optimized person database 618. After the distillation algorithm is performed, the distillation engine service module 612 may transmit the distilled data to the person repository service module 616, the persona repository service module 614, and peer participant nodes 602n. The person repository service module 616 may use the distilled data to update the public person database 622. The persona repository service module 614 may use the distilled data to update the private person database 624. The peer participant nodes 602n may use the distilled data to update respective local database records, as well as distributed database records.

FIG. 7 shows an example data distillation step. An endpoint signal package 700 may be received at a participant node, such as the participant node 602a in FIG. 6, from a participant endpoint, such as the participant endpoint 600 in FIG. 6. The example data distillation step may be performed by the participant node. The example data distillation step may be performed by the distillation engine service module 612 in FIG. 6. The endpoint signal package 700 may comprise a set of signals 702, 704, 706. The set of signals 702, 704, 706 may comprise transformed signals. A signal 702 may comprise a user identifier. The user identifier may comprise a value of ABF38A9F. The user identifier may identify a user and/or device with 1.00 (100%) precision. A signal 704 may comprise an advertisement identifier. The advertisement identifier may comprise a value of FD93698A. The advertisement identifier may identify a user and/or device with 0.80 (80%) precision. A signal 706 may comprise an Internet Protocol (IP) address. The IP address may comprise a value of 839285BB. The IP address may identify a user and/or device with 0.20 (20%) precision.

The participant node may pull each person record with a signal that matches a signal in the endpoint signal package 700. The participant node may pull each person record with a signal above a threshold precision that matches a signal in the endpoint signal package 700. The threshold precision may be 0.80 (80%), 0.60 (60%), 0.50 (50%), or any other precision. The person records may be pulled from an internal database. The person records may be pulled from a public database and/or a distributed database. Person records 710, 720 may be returned based on the signals in the endpoint signal package 700. A person record 710 may be returned based on the signal 702 in the endpoint signal package 700. A person record 720 may be returned based on the signal 704 in the endpoint signal package 700.

The person record 710 may comprise a public person identifier of ABCDEFGH. The person record 710 may comprise a set of signals 712, 714, 716. The set of signals 712, 714, 716 may comprise transformed signals. A signal 712 may comprise a user identifier. The user identifier may comprise a value of ABF38A9F. The user identifier may identify a user and/or device with 1.00 (100%) precision. A signal 714 may comprise an identifier for advertisers. The identifier for advertisers may comprise a value of C1D02830. The identifier for advertisers may identify a user and/or device with 0.80 (80%) precision. A signal 716 may comprise an Internet Protocol (IP) address. The IP address may comprise a value of 56A740BC. The IP address may identify a user and/or device with 0.20 (20%) precision.

The person record 720 may comprise a public person identifier of IJKLMNOP. The person record 720 may comprise a set of signals 722, 724. The set of signals 722, 724 may comprise transformed signals. A signal 722 may comprise an advertisement identifier. The advertisement identifier may comprise a value of FD93698A. The advertisement identifier may identify a user and/or device with 0.80 (80%) precision. A signal 724 may comprise a telephone number. The telephone number may comprise a value of 12309847. The telephone number may identify a user and/or device with 0.40 (40%) precision.

The participant node may generate an ordered signal list 730. The distillation engine service module 612 in FIG. 6 may generate an ordered signal list 730. The ordered signal list 730 may comprise each unique signal from the endpoint signal package 700, the person record 710, and the person record 720 and a corresponding precision. The ordered signal list 730 may be ordered such that signals with a higher precision appear before signals with a lower precision.

FIG. 8 shows an example data distillation step. The example data distillation step may be performed by the participant node 602a in FIG. 6. The example data distillation step may be performed by the distillation engine service module 612 in FIG. 6. Unique signals from the endpoint signal package 700 in FIG. 7 may be added to the person record 710 in FIG. 7 to form a person record 800. The person record 800 may comprise a signal 802, which may comprise the signal 712 in FIG. 7. The person record 800 may comprise a signal 804, which may comprise the signal 714 in FIG. 7. The person record 800 may comprise a signal 806, which may comprise the signal 716 in FIG. 7. The person record 800 may comprise a signal 808, which may comprise the signal 704 in FIG. 7. The person record 800 may comprise a signal 810, which may comprise the signal 706 in FIG. 7.

Unique signals from the endpoint signal package 700 in FIG. 7 may be added to the person record 720 in FIG. 7 to form a person record 820. The person record 820 may comprise a signal 822, which may comprise the signal 722 in FIG. 7. The person record 820 may comprise a signal 824, which may comprise the signal 724 in FIG. 7. The person record 820 may comprise a signal 826, which may comprise the signal 702 in FIG. 7. The person record 820 may comprise a signal 828, which may comprise the signal 706 in FIG. 7. An ordered signal list 830 may comprise the ordered signal list 730 in FIG. 7.

The participant node may generate a signal hash map 840. The distillation engine service module 612 in FIG. 6 may generate a signal hash map 840. The signal hash map 840 may pair signals with one or more personal records. Each signal in the ordered signal list 830 may comprise a corresponding row in the signal hash map 840. For each row in the signal hash map 840, if a corresponding signal appears in the person record 800, then a corresponding public person identifier (ABCDEFGH) may be associated with the corresponding signal. For each row in the signal hash map 840, if a corresponding signal appears in the person record 820, then a corresponding public person identifier (IJKLMNOP) may be associated with the corresponding signal.

FIG. 9 shows an example data distillation step. The example data distillation step may be performed by the participant node 602a in FIG. 6. The example data distillation step may be performed by the distillation engine service module 612 in FIG. 6. A signal hash map 900 may comprise the signal hash map 840 in FIG. 8. The participant node may merge the old person records (800 and 820 in FIG. 8) into a single new person record 910. The participant node may remove the old person records (800 and 820 in FIG. 8).

The new person record 910 may comprise a new public person identifier comprising the value QRSTUVWX. The new person record 910 may comprise at least one signal that identifies a user and/or device with 1.00 (100%) precision. The new person record 910 may comprise a set of signals 912, 914, 916, 918, 920, 922. The new person record 910 may use the old person records with public person identifiers ABCDEFGH and IJKLMNOP as references for adding the set of signals 912, 914, 916, 918, 920, 922.

The new person record 910 may comprise a signal 912, which may comprise the signal 802 in FIG. 8. The new person record 910 may comprise a signal 914, which may comprise the signal 804 in FIG. 8. The new person record 910 may comprise a signal 916, which may comprise the signal 810 in FIG. 8. The new person record 910 may comprise a signal 918, which may comprise the signal 808 in FIG. 8. The new person record 910 may comprise a signal 920, which may comprise the signal 824 in FIG. 8. The new person record 910 may comprise a signal 922, which may comprise the signal 806 in FIG. 8.

Figure 10:
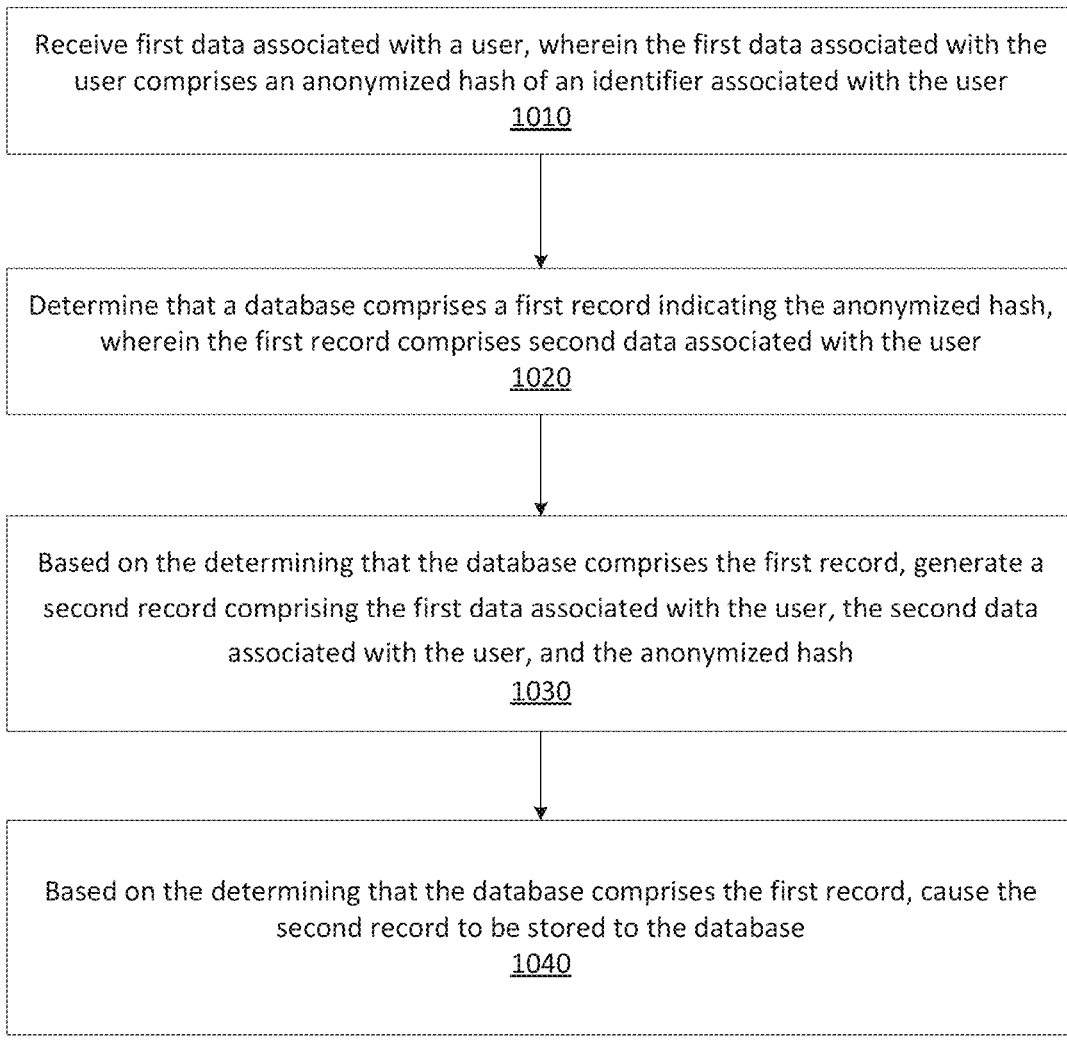
FIG. 10 shows an example method.

FIG. 10 shows an example method. At step 1010, first data associated with a user may be received. For example, the participant node 602a in FIG. 6 may receive first data associated with a user. The first data associated with the user may comprise an anonymized hash of an identifier associated with the user. The first data may comprise data associated with viewership of the user. The first data may be associated with consumer behavior of the user. The first data may be from a service provider. The service provider may provide content to the user. The first data may be associated with use of a service of the service provider by the user.

The anonymized hash may comprise an output of a hash function applied to the identifier. The hash function may comprise a one-way hash function. The identifier associated with the user may comprise personal identifying information associated with the user. The personal identifying information associated with the user may comprise at least one of a telephone number, an email address, an address, an account number, a username, or a media access control (MAC) address.

At step 1020, a determination may be made that a database comprises a first record indicating the anonymized hash. For example, the participant node 602a in FIG. 6 may determine that a database comprises a first record indicating the anonymized hash. The first record may comprise second data associated with the user. The database may be accessible to a plurality of service providers. The personal identifying information associated with the user may be stored on a private database associated with a first service provider. The database may comprise a plurality of records indicating behavior data associated with users of services of a plurality of service providers. The first data associated with the user may comprise data from a first service provider. The second data associated with the user may comprise data from a second service provider.

At step 1030, a second record comprising the first data associated with the user, the second data associated with the user, and the anonymized hash may be generated based on the determining that the database comprises the first record. For example, the participant node 602*a* in FIG. 6 may generate a second record comprising the first data associated with the user, the second data associated with the user, and the anonymized hash based on the determining that the database comprises the first record. The database may comprise a distributed database. The distributed database may be shared across a network. For example, the distributed database may be shared by nodes of the network.

An indication of an anonymized hash of another identifier associated with the user may be received. For example, the participant node 602*a* in FIG. 6 may receive an indication of an anonymized hash of another identifier associated with the user. A third record comprising the anonymized hash of the identifier and the anonymized hash of the other identifier may be generated. The participant node 602*a* in FIG. 6 may generate a third record comprising the anonymized hash of the identifier and the anonymized hash of the other identifier. The third record may be caused to be stored to the database. The participant node 602*a* in FIG. 6 may cause the third record to be stored to the database.

A determination may be made that the database comprises an anonymized hash of other information associated with the user. For example, the participant node 602*a* in FIG. 6 may determine that the database comprises an anonymized hash of other information associated with the user. The second record may comprise an indication of the anonymized hash of the other information. The generating the second record may be based on determining that the database does not comprise an indication of the first data associated with the user. The generating the second record may be based on determining that the first record does not comprise the first data.

At step 1040, the second record may be caused to be stored to the database based on the determining that the database comprises the first record. For example, the participant node 602*a* in FIG. 6 may cause the second record to be stored to the database based on the determining that the database comprises the first record.

A participant node may receive a set of signals from a participant endpoint. A first signal of the set of signals may comprise a hash of a media access control (MAC) address. A second signal of the set of signals may comprise a hash of a user identifier. The participant node may examine a blockchain. The participant node may find a first record in the blockchain comprising the first signal. The participant node may find a second record in the blockchain comprising the second signal. The participant node may determine that the first record and the second record refer to the same user and/or device and that the same user and/or device initiated the set of signals. The participant node may generate a third record. The third record may comprise all unique data of the first record, the second record, and the set of signals. The participant node may cause the third record to be added to the blockchain. The first record and the second record may be removed from the blockchain.

For example, an administrator of a distributed database may receive user data. The user data may comprise a hash of an email address of the user. The user data may indicate content that the user viewed. The user data may indicate a time and/or date that the user viewed the content. The administrator may search the database using the hash. The administrator may determine that a record stored in the database comprises an indication of the hash. The record may comprise an indication of other data associated with the user. The administrator may generate a record comprising the received user data and the data from the record. The administrator may store the new record in the database.

Figure 11:
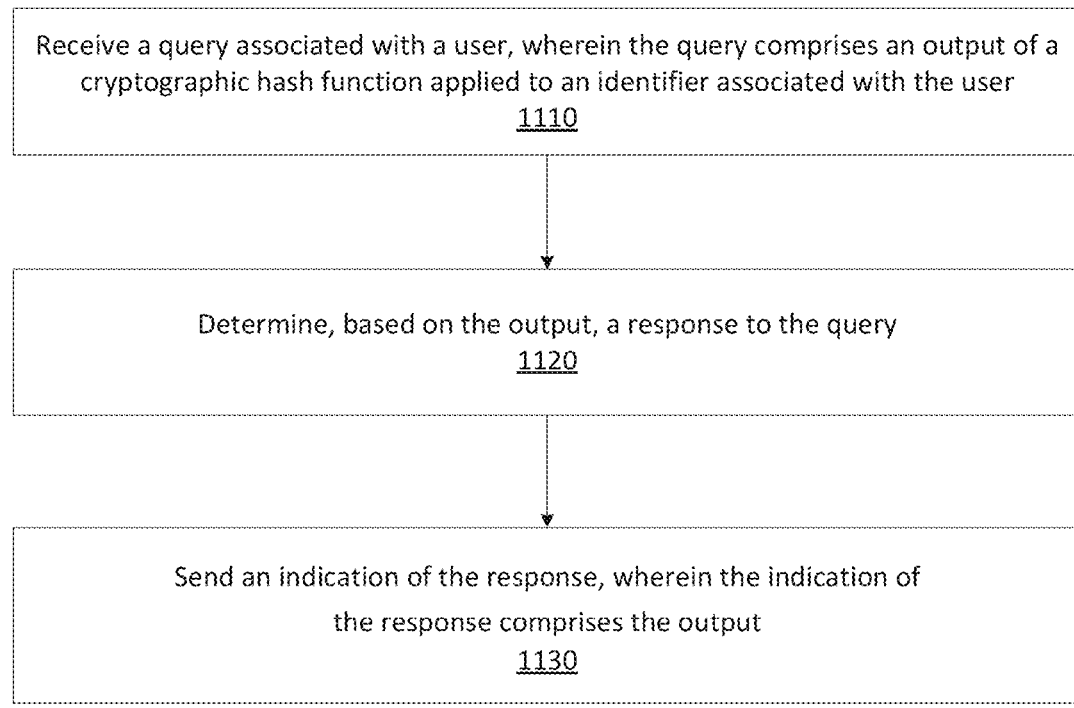
FIG. 11 shows an example method.

FIG. 11 shows an example method. At 1110, a query associated with a user may be received. For example, one of the peer participant nodes 602*n* in FIG. 6 may receive a query associated with a user. The query may comprise an output of a cryptographic hash function applied to an identifier associated with the user. A first computing device may be configured to determine an identity of the user by applying another cryptographic hash function to the output. The query may be from a service provider. The service provider may provide content to the user. The cryptographic hash function may comprise a one-way hash function. The identifier associated with the user may comprise personal identifying information associated with the user.

At step 1120, a response to the query may be determined based on the output. For example, one of the peer participant nodes 602*n* in FIG. 6 may determine a response to the query based on the output. An identity of the user may be determined based on the output of the cryptographic hash function. The one of the peer participant nodes 602*n* in FIG. 6 may determine an identity of the user based on the output of the cryptographic hash function. The response to the query may be determined based on the identity of the user. The one of the peer participant nodes 602*n* in FIG. 6 may determine the response to the query based on the identity of the user. The response may comprise data associated with viewership of the user. The response may be associated with consumer behavior of the user. The response may be associated with use of a service of the service provider by the user.

At step 1130, an indication of the response may be sent. For example, the one of the peer participant nodes 602*n* in FIG. 6 may send an indication of the response. The indication of the response may comprise the output.

As an example, a device associated with a digital content provider may receive a request for a listing of television shows viewed by a user during a calendar month. The digital content provider may receive the request from a device associated with an advertising agency. The request may comprise a hash of a telephone number of the user. The device may search a private database of user information for a viewing history of the user. Based on the viewing history, the device may determine the television shows viewed by the user during the calendar month. The device may send an indication of the television shows to the device associated with the advertising agency.

Figure 12:
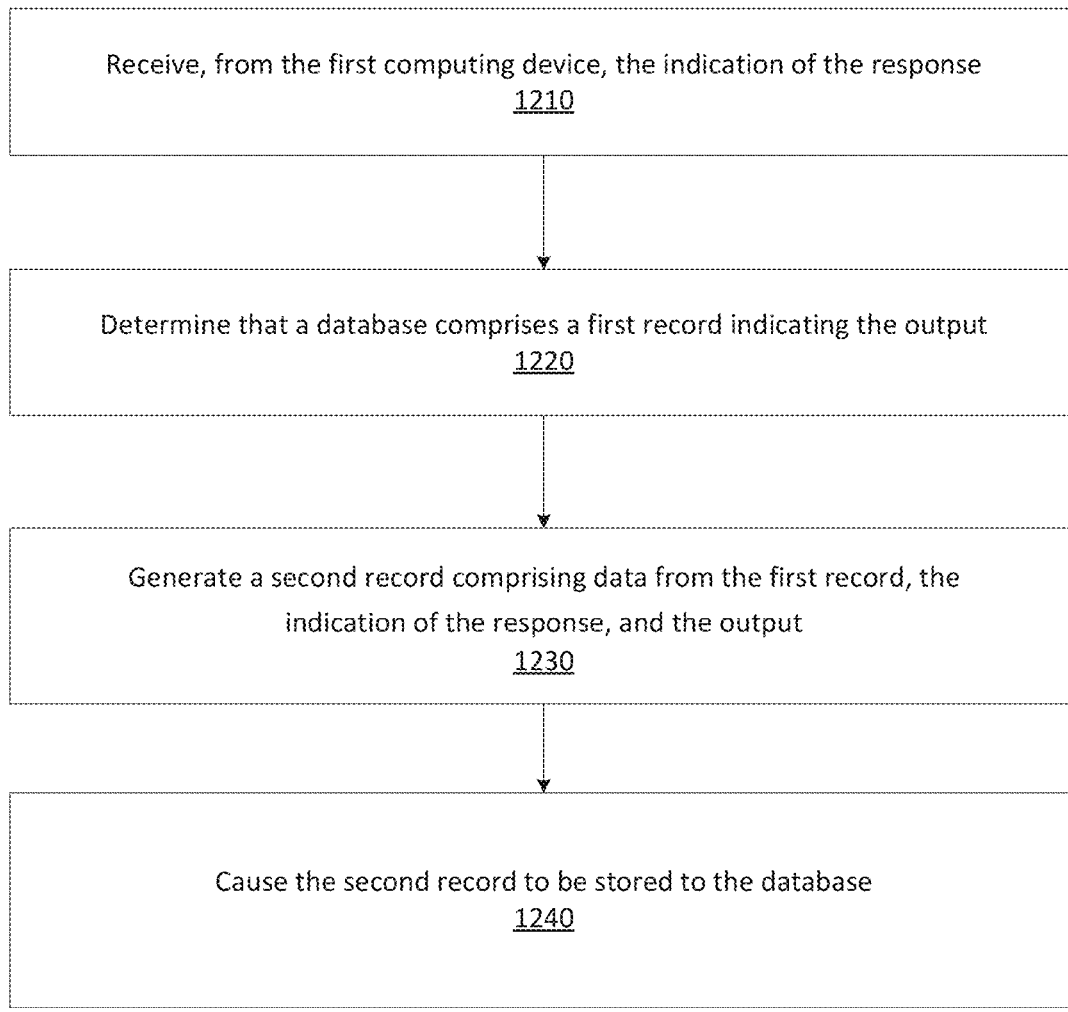
FIG. 12 shows an example method.

FIG. 12 shows an example method. At step 1210, an indication of a response to a query may be received. The query may be associated with a user. The response may be received from a first computing device. For example, the participant node 602*a* in FIG. 6 may receive the indication of the response from the one of the peer participant nodes 602*n*. The query associated with the user may comprise data from a first service provider. The response may comprise data from a second service provider.

At step 1220, a determination may be made that a database comprises a first record. For example, the participant node 602*a* in FIG. 6 may determine that the database comprises the first record. The first record may indicate an output of a cryptographic hash function applied to personal identifying information associated with the user. The database may be accessible to a plurality of service providers.

Personal identifying information associated with the user may be stored on a private database associated with a first service provider. The personal identifying information associated with the user may comprise at least one of a telephone number, an email address, an address, an account number, a username, a media access control (MAC) address, and/or another identifier associated with the user. The database may comprise a plurality of records indicating behavior data associated with users of services of a plurality of service providers.

At step 1230, a second record comprising data from the first record, the indication of the response, and/or the output may be generated. For example, the participant node 602a in FIG. 6 may generate the second record comprising data from the first record, the indication of the response, and the output.

An identifier associated with the user may be received. For example, the participant node 602a in FIG. 6 may receive an indication of a cryptographic hash of another identifier associated with the user. A third record comprising the output of the cryptographic hash function applied to the identifier associated with the user and the cryptographic hash of the other identifier may be generated. For example, the participant node 602a in FIG. 6 may generate a third record comprising the output of the cryptographic hash function applied to the identifier associated with the user and the cryptographic hash of the other identifier. The third record may be caused to be stored to the database. The participant node 602a in FIG. 6 may cause the third record to be stored to the database.

A determination may be made that the database comprises an anonymized hash of other information associated with the user. For example, the participant node 602a in FIG. 6 may determine that the database comprises an anonymized hash of other information associated with the user. The second record may comprise an indication of the anonymized hash of the other information. The generating the second record may be based on determining that the database does not comprise an indication of the query associated with the user. The generating the second record may be based on determining that the first record does not comprise the query.

At step 1240, the second record may be caused to be stored to the database. For example, the participant node 602a in FIG. 6 may cause the second record to be stored to the database.

A service provider may prepare a query. A participant node may receive a response to the query. The participant node may locate a first record in a database comprising an encrypted version of the query. The participant node may generate a second record, comprising an encrypted version of the query and an encrypted version of the response. The participant node may add the second record to the database.

For example, a distributed database node may receive a response from a service provider to a query about a user from another service provider. The response may comprise a hash of a username of the user. The node may search the distributed database using the hash. The node may determine that there is a record stored to the database that comprises the hash. The node may generate a record comprising an indication of the response and data from the record stored to the blockchain. The record may comprise an indication of the hash. The node may send an indication of the record to other distributed database nodes.

Figure 13:
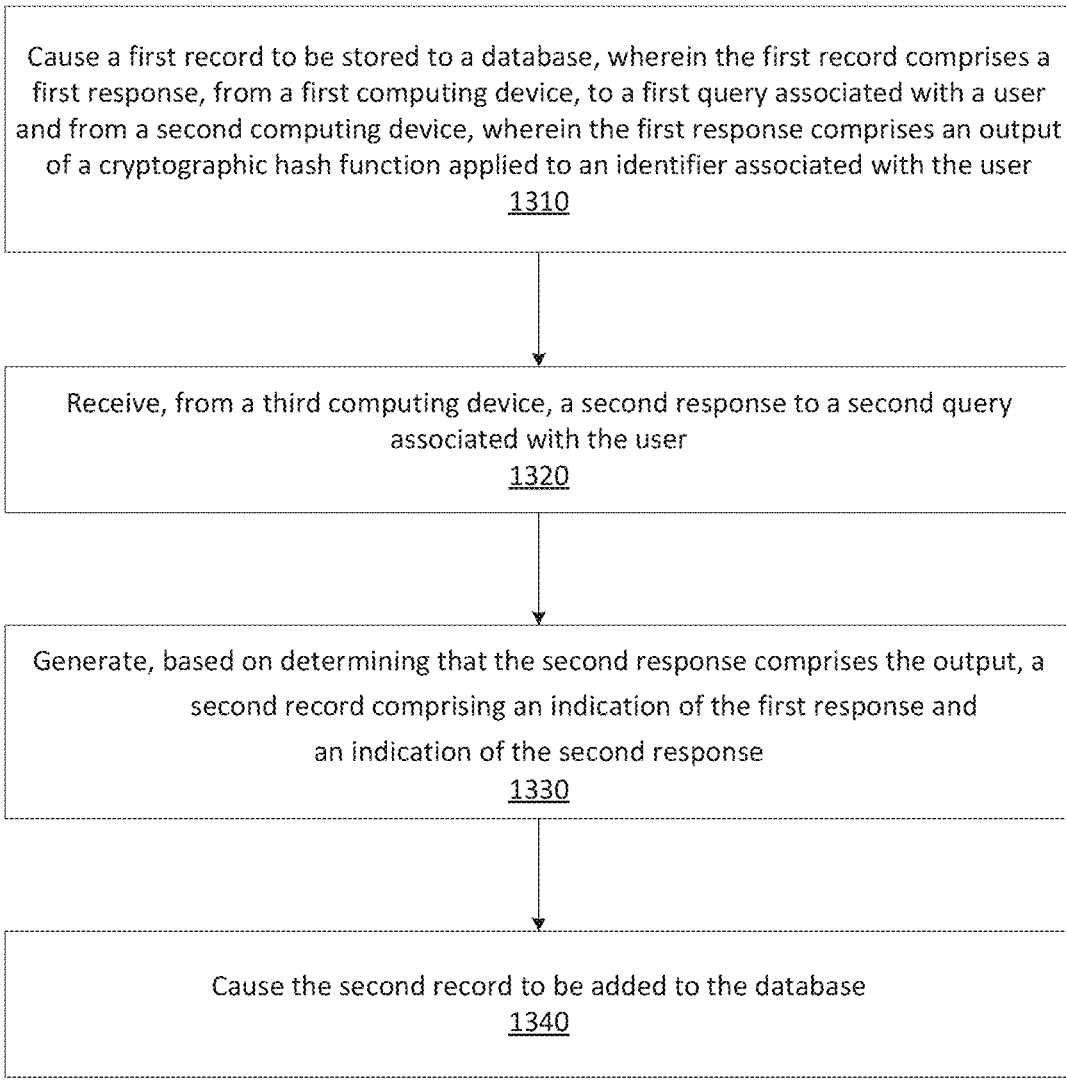
FIG. 13 shows an example method.

FIG. 13 shows an example method. At step 1310, a first record may be caused to be stored to a database. For example, the participant node 602a in FIG. 6 may cause a first record to be stored to a database. The first record may comprise a first response from a first computing device to a first query associated with a user. The first query may be from a second computing device. The first response may comprise an output of a cryptographic hash function applied to an identifier associated with the user. An entity associated with the second computing device may be billed based on the causing the first record to be stored to the database. For example, the participant node 602a in FIG. 6 may bill an entity associated with the second computing device based on the causing the first record to be stored to the database.

The first response may comprise data associated with viewership of the user. The first response may be associated with consumer behavior of the user. The first query may be from a service provider. The service provider may provide content to the user. The first response may be associated with use of a service of the service provider by the user. The cryptographic hash function may comprise a one-way hash function. The identifier associated with the user may comprise personal identifying information associated with the user. The database may be accessible to a plurality of service providers. The personal identifying information associated with the user may be stored on a private database associated with a first service provider. The personal identifying information associated with the user may comprise at least one of a telephone number, an email address, an address, an account number, a username, or a media access control (MAC) address. The database may comprise a plurality of records indicating behavior data associated with users of services of a plurality of service providers.

At step 1320, a second response to a second query associated with the user may be received from a third computing device. For example, the participant node 602a in FIG. 6 may receive a second response to a second query associated with the user from a third computing device. The second query may be from a fourth computing device. The database may be accessible to a plurality of computing devices. The plurality of computing devices may comprise the first computing device, the second computing device, and the third computing device. The second query may be sent to the third computing device. For example, the participant node 602a in FIG. 6 may send the second query to the third computing device.

The first computing device, the second computing device, and the third computing device each may be associated with at least one of a service provider, a content provider, a retailer, a content creator, or an advertiser associated with the user. The first query associated with the user may comprise data from a first service provider. The second query associated with the user may comprise data from a second service provider.

At step 1330, a second record comprising an indication of the first response and an indication of the second response may be generated based on determining that the second response comprises the output. For example, the participant node 602a in FIG. 6 may generate a second record comprising an indication of the first response and an indication of the second response based on determining that the second response comprises the output. The generating the second record may be based on a determination that information identifying the user may comprise a verifiable type of information.

The sending the second query to the third computing device may be based on the determining that the second response comprises the output. The sending the second query to the third computing device may be based on determining that a third record stored to the database indicates that an entity associated with the third computing device provides a service to the user associated with the output. For example, the participant node 602a in FIG. 6 may determine that a third record stored to the database indicates that an entity associated with the third computing device provides a service to the user associated with the output. The database may comprise a distributed database.

An indication of a cryptographic hash of another identifier associated with the user may be received. For example, the participant node 602a in FIG. 6 may receive an indication of a cryptographic hash of another identifier associated with the user. A third record comprising the output of the cryptographic hash function applied to the identifier associated with the user and the cryptographic hash of the other identifier may be generated. For example, the participant node 602a in FIG. 6 may generate a third record comprising the output of the cryptographic hash function applied to the identifier associated with the user and the cryptographic hash of the other identifier. The third record may be caused to be stored to the database. The participant node 602a in FIG. 6 may cause the third record to be stored to the database.

A determination may be made that the database comprises an anonymized hash of other information associated with the user. For example, the participant node 602a in FIG. 6 may determine that the database comprises an anonymized hash of other information associated with the user. The second record may comprise an indication of the anonymized hash of the other information. The generating the second record may be based on determining that the database does not comprise an indication of the first query associated with the user. The generating the second record may be based on determining that the first record does not comprise the first query.

At step 1340, the second record may be caused to be added to the database. For example, the participant node 602a in FIG. 6 may cause the second record to be added to the database. A source of the second query may be billed based on the causing the second record to be added to the database. The participant node 602a in FIG. 6 may bill a source of the second query based on the causing the second record to be added to the database.

A service provider may prepare a first query for users. An advertiser may prepare a second query for users. A node participant may receive a first response to the first query from a particular user. The node participant may generate a first record comprising the first response. The node participant may cause the first record to be added to a database. The node participant may receive a second response to the second query from the particular user. The node participant may determine that the particular user generated both the first response and the second response. In response to determining that the particular user generated both the first response and the second response, the node participant may generate a second record for the database, wherein the second record comprises the first response and the second response. The node participant may cause the second node to be added to the database. The first record may be removed from the database.

As an example, a distributed database node may add a record to a distributed database. The database may comprise an indication of a response from a service provider to a query from another service provider about a user. The response may comprise a hash of a MAC address of a device associated with the user. The node may receive a new response to another query associated with the user. The node may generate a record comprising the new response, the response in the record, and the hash associated with the user. The node may send an indication of the new record to other distributed database nodes. The other distributed database nodes may add the new record to the database. Eventually, the older record may be pruned from the database, such as based on an amount of memory available for storing the database.

Figure 14:
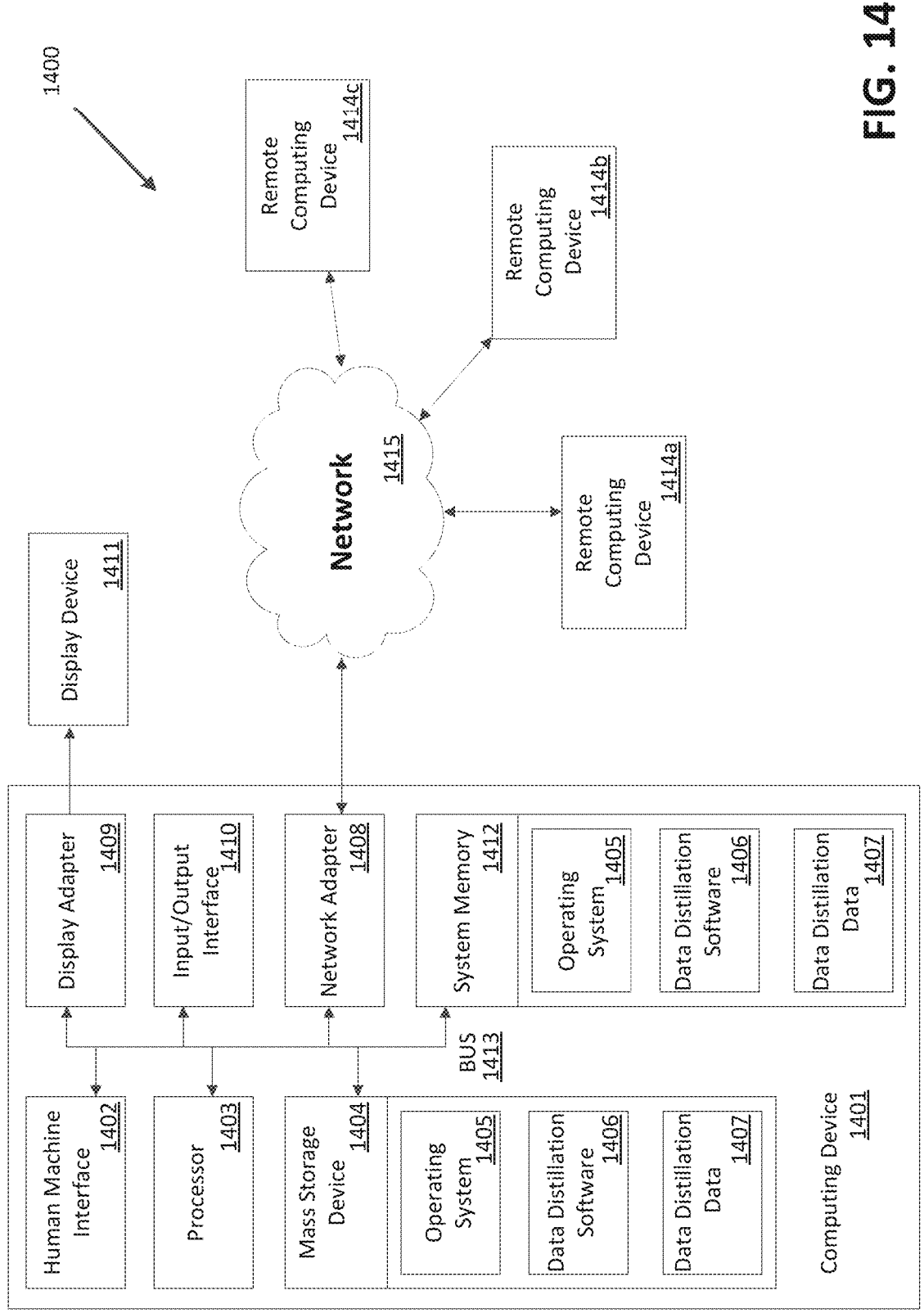
FIG. 14 shows an example computing environment.

The systems, methods, and apparatuses described herein may be implemented on a computing device such as a computing device 1401 (e.g., computer) as shown in FIG. 14 and described below. The one or more nodes 110 in FIG. 1 may be and/or comprise a computing device as shown in FIG. 14. The participant node 602a and peer participant nodes 602n in FIG. 6 may be and/or comprise a computing device as shown in FIG. 14. Similarly, the methods, systems, and apparatuses disclosed may utilize one or more computing device to perform one or more functions in one or more locations. FIG. 14 is a block diagram showing an operating environment for performing the disclosed methods, systems, and apparatuses. This operating environment is not intended to suggest any limitation as to the scope of use or functionality of operating environment architecture. Neither should the operating environment be interpreted as having any dependency or requirement relating to any one or combination of components shown in the operating environment.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 1401. The components of the computing device 1401 may comprise, but are not limited to, one or more processors 1403, a system memory 1412, and a system bus 1413 that couples various system components including the processor 1403 to the system memory 1412. With multiple processors 1403, the system may utilize parallel computing.

The system bus 1413 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1413, and all buses specified in this description may be implemented over a wired or wireless network connection and each of the subsystems, including the processor 1403, a mass storage device 1404, an operating system 1405, data distillation software 1406, data distillation data 1407, a network adapter 1408, system memory 1412, an Input/Output Interface 1410, a display adapter 1409, a display device 1411, and a human machine interface 1402, may be contained within one or more remote computing devices 1414a,b,c at physically separate locations, connected through buses of this form, in effect implementing a fully distributed system.

The computing device 1401 typically comprises a variety of computer readable media. Readable media may be any available media that is accessible by the computing device 1401 and comprises both volatile and non-volatile media, removable and non-removable media. The system memory 1412 comprises computer readable media in the form of volatile memory, such as random access memory (RAM), and/or non-volatile memory, such as read only memory (ROM). The system memory 1412 typically contains data such as data distillation data 1407 and/or program modules such as operating system 1405 and data distillation software 1406 that are immediately accessible to and/or are presently operated on by the processor 1403.

The computing device 1401 may comprise other removable/non-removable, volatile/non-volatile computer storage media. FIG. 14 shows a mass storage device 1404 which may provide non-volatile storage of computer code, computer readable instructions, data structures, program modules, and other data for the computing device 1401. A mass storage device 1404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1404, including an operating system 1405 and data distillation software 1406. Each of the operating system 1405 and data distillation software 1406 (or some combination thereof) may comprise elements of the programming and the data distillation software 1406. Data distillation data 1407 may be stored on the mass storage device 1404. Data distillation data 1407 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 1401 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 1403 via a human machine interface 1402 that is coupled to the system bus 1413, but may be connected by other interface and bus structures, such as a parallel port, game port, an IEEE 1394 Port (also known as a Firewire port), a serial port, or a universal serial bus (USB).

A display device 1411 may be connected to the system bus 1413 via an interface, such as a display adapter 1409. It is contemplated that the computing device 1401 may have more than one display adapter 1409 and the computing device 1401 may have more than one display device 1411. A display device may be a monitor, an LCD (Liquid Crystal Display), or a projector. Output peripheral devices may comprise components such as speakers (not shown) and a printer (not shown) which may be connected to the computing device 1401 via Input/Output Interface 1410. Any step and/or result of the methods may be output in any form to an output device. Such output may be any form of visual representation, including, but not limited to, textual, graphical, animation, audio, tactile, and the like. The display 1411 and computing device 1401 may be part of one device, or separate devices.

The computing device 1401 may operate in a networked environment using logical connections to one or more remote computing devices 1414a,b,c. A remote computing device may be a personal computer, portable computer, smartphone, a server, a router, a network computer, a peer device or other common network node, and so on. Logical connections between the computing device 1401 and a remote computing device 1414a,b,c may be made via a network 1415, such as a local area network (LAN) and a general wide area network (WAN). Such network connections may be through a network adapter 1408. A network adapter 1408 may be implemented in both wired and wireless environments. Such networking environments are conventional and commonplace in dwellings, offices, enterprise-wide computer networks, intranets, and the Internet.

Application programs and other executable program components such as the operating system 1405 are shown herein as discrete blocks, although it is recognized that such programs and components reside at various times in different storage components of the computing device 1401, and are executed by the data processor(s) of the computer. An implementation of data distillation software 1406 may be stored on or transmitted across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

What is claimed is:
1. A system comprising:
a first computing device configured to:
receive a query associated with a user, wherein the query comprises an output of a cryptographic hash function applied to an identifier associated with the user;

determine, based on the output, a response to the query; and send an indication of the response, wherein the indication of the response comprises the output; and a second computing device configured to:

receive, from the first computing device, the indication of the response;

determine that a database comprises a first record indicating the output;

generate a second record comprising data from the first record, the indication of the response, and the output;

cause the second record to be stored to the database; and cause, in response to causing the second record to be stored to the database, the first record to be removed from the database.

2. The system of claim 1, wherein the cryptographic hash function comprises a one-way function.

3. The system of claim 1, wherein the database is accessible to a plurality of service providers;

wherein the cryptographic hash function comprises a hash of personal identifying information associated with the user; and wherein the personal identifying information is stored on a private database associated with a first service provider.

4. The system of claim 1, wherein the query associated with the user comprises data from a first service provider, and wherein the response comprises data from a second service provider.

5. The system of claim 1, wherein the second computing device is configured to cause a distributed ledger record indicating a source of the query and an entity associated with the first computing device to be stored to a distributed ledger.

6. The system of claim 5, wherein the second computing device is configured to generate, based on the distributed ledger record, at least one of a bill or a payment.

7. A method comprising:

receiving first data associated with a user, wherein the first data associated with the user comprises an anonymized hash of an identifier associated with the user;

determining that a database comprises a first record indicating the anonymized hash, wherein the first record comprises second data associated with the user; and based on the determining that the database comprises the first record:

generating a second record comprising the first data associated with the user, the second data associated with the user, and the anonymized hash;

causing the second record to be stored to the database; and causing, based on the causing the second record to be stored to the database, the first record to be removed from the database.

8. The method of claim 7, wherein the first data comprises data associated with at least one of viewership, consumer behavior, or use of a service of the user.

9. The method of claim 7, wherein the anonymized hash comprises an output of a one-way hash function.

10. The method of claim 7, wherein the identifier associated with the user comprises at least one of a telephone number, an email address, an address, an account number, a username, or a media access control (MAC) address.

11. The method of claim 7, wherein the first data associated with the user comprises data from a first service provider, and wherein the second data associated with the user comprises data from a second service provider.

12. The method of claim 7, wherein the database comprises a distributed database.

13. The method of claim 7, comprising:

receiving an indication of an anonymized hash of another identifier associated with the user;

generating a third record comprising the anonymized hash of the identifier and the anonymized hash of the another identifier; and causing the third record to be stored to the database.

14. The method of claim 7, wherein the generating the second record is based on determining that the database does not comprise an indication of the first data associated with the user.

15. A method comprising:

causing a first record to be stored to a database, wherein the first record comprises a first response, from a first computing device, to a first query associated with a user, wherein the first query is received from a second computing device, wherein the first response comprises an output of a cryptographic hash function applied to an identifier associated with the user;

receiving, from a third computing device, a second response to a second query associated with the user;

generating, based on determining that the second response comprises the output, a second record comprising an indication of the first response and an indication of the second response;

causing the second record to be added to the database; and causing, based on the causing the second record to be added to the database, removing the first record from the database.

16. The method of claim 15, wherein the second query is from a fourth computing device.

17. The method of claim 15, wherein the first computing device, the second computing device, and the third computing device are each associated with at least one of a service provider, a content provider, a retailer, a content creator, or an advertiser associated with the user.

18. The method of claim 15, wherein the database comprises a plurality of records indicating behavior data associated with users of services of a plurality of service providers; and wherein the first query associated with the user comprises data from a first service provider, and wherein the second query associated with the user comprises data from a second service provider.

19. The method of claim 15, further comprising:

receiving an indication of an output of the cryptographic hash function applied to another identifier associated with the user;

generating a third record comprising the output of the cryptographic hash function applied to the identifier associated with the user and the output of the cryptographic hash function applied to the another identifier; and causing the third record to be stored to the database.

20. The method of claim 15, wherein the second record further comprises the output.

* * * * *